(12) United States Patent
Kim

(10) Patent No.: US 7,391,467 B2
(45) Date of Patent: Jun. 24, 2008

(54) SIGNAL DELIVERY APPARATUS, HINGE APPARATUS AND IMAGE PHOTOGRAPHING APPARATUS

(75) Inventor: Nam-il Kim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 761 days.

(21) Appl. No.: 10/777,074

(22) Filed: Feb. 13, 2004

(65) Prior Publication Data

US 2004/0223080 A1 Nov. 11, 2004

(30) Foreign Application Priority Data

May 2, 2003 (KR) ...................... 10-2003-0028324

(51) Int. Cl.
*H04N 5/225* (2006.01)
(52) U.S. Cl. .................. 348/375; 348/373; 348/376; 348/220.1; 386/118
(58) Field of Classification Search ......... 348/375–376, 348/373, 220.1; 396/424, 419; 386/118
See application file for complete search history.

(56) References Cited

U.S. PATENT DOCUMENTS

| | | | | |
|---|---|---|---|---|
| 4,106,037 A | * | 8/1978 | Nakamura et al. | .......... 396/178 |
| 4,493,542 A | | 1/1985 | Ohmura et al. | |
| 5,043,822 A | * | 8/1991 | Ichiyoshi et al. | ............. 348/376 |
| 6,226,448 B1 | * | 5/2001 | Takagi et al. | ................. 386/118 |
| 6,252,223 B1 | * | 6/2001 | Kamijo | .................. 250/231.13 |
| D487,104 S | * | 2/2004 | Obata | ........................ D16/202 |
| 6,788,960 B2 | * | 9/2004 | Masutani et al. | ......... 455/556.1 |
| 7,253,843 B2 | * | 8/2007 | Lee | ............................. 348/565 |
| 2001/0004269 A1 | * | 6/2001 | Shibata et al. | ......... 348/333.06 |
| 2003/0117501 A1 | | 6/2003 | Shirakawa | |

FOREIGN PATENT DOCUMENTS

| | | |
|---|---|---|
| EP | 1517546 | 3/2005 |
| JP | 07-226871 | 8/1995 |
| JP | 08-270638 | 10/1996 |
| JP | 10-290084 | 10/1998 |
| JP | 2000-200993 | 7/2000 |
| JP | 2001-53995 | 2/2001 |
| JP | 2002-064604 | 2/2002 |
| JP | 2006-62572 | 2/2002 |
| JP | 2002-094862 | 3/2002 |
| JP | 2003-071773 | 3/2003 |
| KR | 1020000044499 | 7/2000 |
| WO | WO 97/11506 | 3/1997 |

* cited by examiner

*Primary Examiner*—David Ometz
*Assistant Examiner*—Pritham D. Prabhakher
(74) *Attorney, Agent, or Firm*—Roylance, Abrams, Berdo & Goodman, L.L.P.

(57) ABSTRACT

A hinge apparatus for an image photographing apparatus wherein the hinge apparatus rotatably connects a housing with respect to a main body so that the housing can rotate in a predetermined rotation range. The hinge apparatus includes a fixing bracket secured to the main body, a hinge unit secured to the housing and connected to the fixing bracket to be reciprocatingly rotatable within a predetermined angle, a shaft member for rotatably connecting the hinge unit and the fixing bracket so that the hinge unit and the fixing bracket can be rotated with respect to each other, and a sensing unit disposed on the hinge unit and/or the fixing bracket to sense the relative rotational range of the hinge unit with respect to the fixing bracket.

26 Claims, 17 Drawing Sheets

SIGNAL DELIVERY APPARATUS, HINGE APPARATUS AND IMAGE PHOTOGRAPHING APPARATUS

CROSS-REFERENCE TO RELATED APPLICATIONS

This application claims the benefit of Korean Patent Application No. 2003-28324 filed May 2, 2003, in the Korean Intellectual Property Office, the disclosure of which is incorporated herein by reference.

BACKGROUND

1. Field of the Invention

The present invention relates to signal delivery in a digital camera, and, more particularly, a signal delivery apparatus which electrically connects for signal delivery, a first and second member rotating in relation to each other, a hinge apparatus and an image photographing apparatus (digital camera) using the same.

2. Description of the Related Art

Generally, a digital still camera (DSC) converts images input through a lens into digital signals and records the digitized signals on a recording medium such as a hard disc or a memory card. Captured images are not necessarily recorded on film (e.g., 35 mm film), but can instead be stored in the recording medium and be directly output to an external device such as a computer, without having to use intermediate devices such as a scanner. Such a DSC has a high degree of compatibility with a personal computer, enabling easy editing and correcting of the photo image. With almost the same structure as that of regular camera, the DSC is also easy to carry. The DSC is primarily comprised of a lens device, a memory device, a signal modulating device, and a display device. However, due to the limited capacity of the recording medium, the DSC is mostly used to photograph still images. While in theory the DSC is able to capture motion pictures for a limited time, in practice, it is almost impossible to do so for a long period of time. In addition, as the DSC is currently unable to record and reproduce sound, the DSC is usually not used to take, record or reproduce motion pictures. Alternatively, a recording/reproducing apparatus such as a camcorder can be used to record and reproduce audio information as well as images of the object. Currently available camcorders typically use electromagnetic tape as a recording medium.

The camcorder includes a lens device, a signal converting device, a deck device for recording/reproducing captured images and a display device. The camcorder usually uses a cassette tape as a recording medium which is mounted on the deck device to record captured motion pictures on the cassette tape. Additionally, the camcorder is provided with a microphone and speaker devices, and is able to capture motion pictures on the cassette tape mounted thereon for almost an hour. Camcorders can also photograph still images, but due to somewhat poor image quality as compared to the DSC, the camcorder is usually used for motion picture photographing. Additionally, the camcorder has a more complicated structure than the DSC, and a greater volume and is more expensive.

As described above, in order to record and reproduce image and sound, consumers need to keep both a DSC and camcorder, which can be expensive. Furthermore, in order to record and reproduce image and sound, consumers need to carry both the DSC and the camcorder, which can be awkward and physcially tiring.

SUMMARY OF THE INVENTION

An object of the present invention is to substantially solve at least the above problems and/or disadvantages and to provide at least the advantages described below.

Accordingly, it is an object of the present invention to provide a hinge apparatus for an image photographing apparatus wherein the hinge apparatus rotatably connects a housing with respect to a main body so that the housing can rotate in a predetermined rotation range. The hinge apparatus includes a fixing bracket secured to the main body, a hinge unit secured to the housing and connected to the fixing bracket to be reciprocatingly rotatable within a predetermined angle, and a shaft member for rotatably connecting the hinge unit and the fixing bracket so that the hinge unit and the fixing bracket can be rotated with respect to each other. The hinge apparatus further includes a sensing unit disposed on the hinge unit and/or the fixing bracket to sense the relative rotational range of the hinge unit with respect to the fixing bracket.

BRIEF DESCRIPTION OF THE DRAWINGS

The above objects and other features of the present invention will become more apparent by describing in detail a preferred embodiment thereof with reference to the attached drawings, in which.

DETAILED DESCRIPTION OF THE PREFERRED EMBODIMENT

Hereinafter, the embodiments of the present invention will be described in detail with reference to the accompanying drawings.

Figure 1:
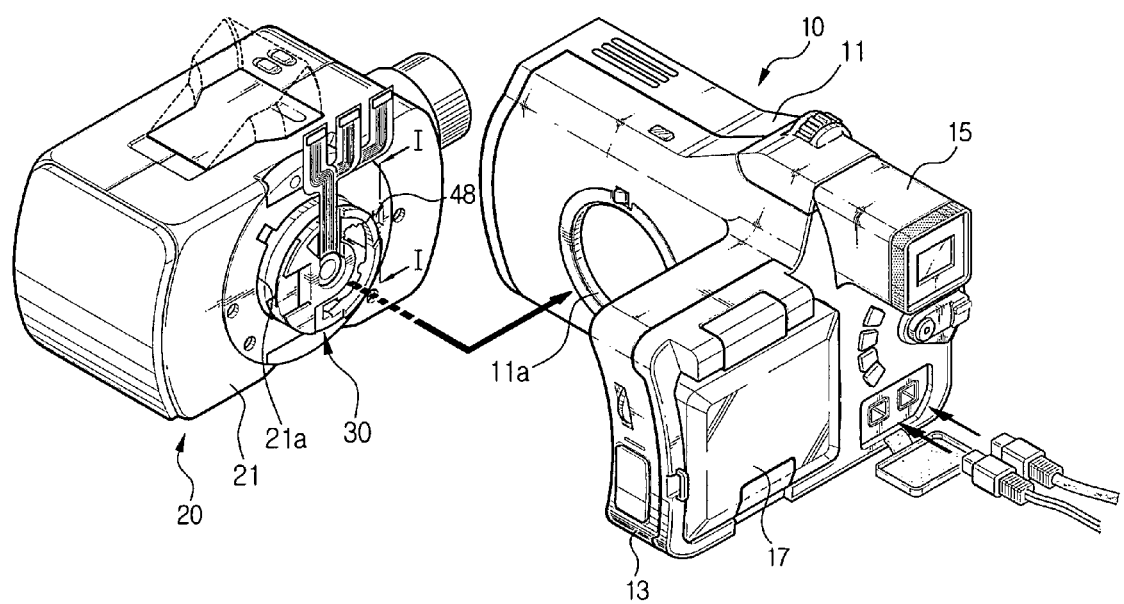
FIG. 1 is a perspective view illustrating two main components of an image photographing apparatus according to a preferred embodiment of the present invention.
Figure 2:
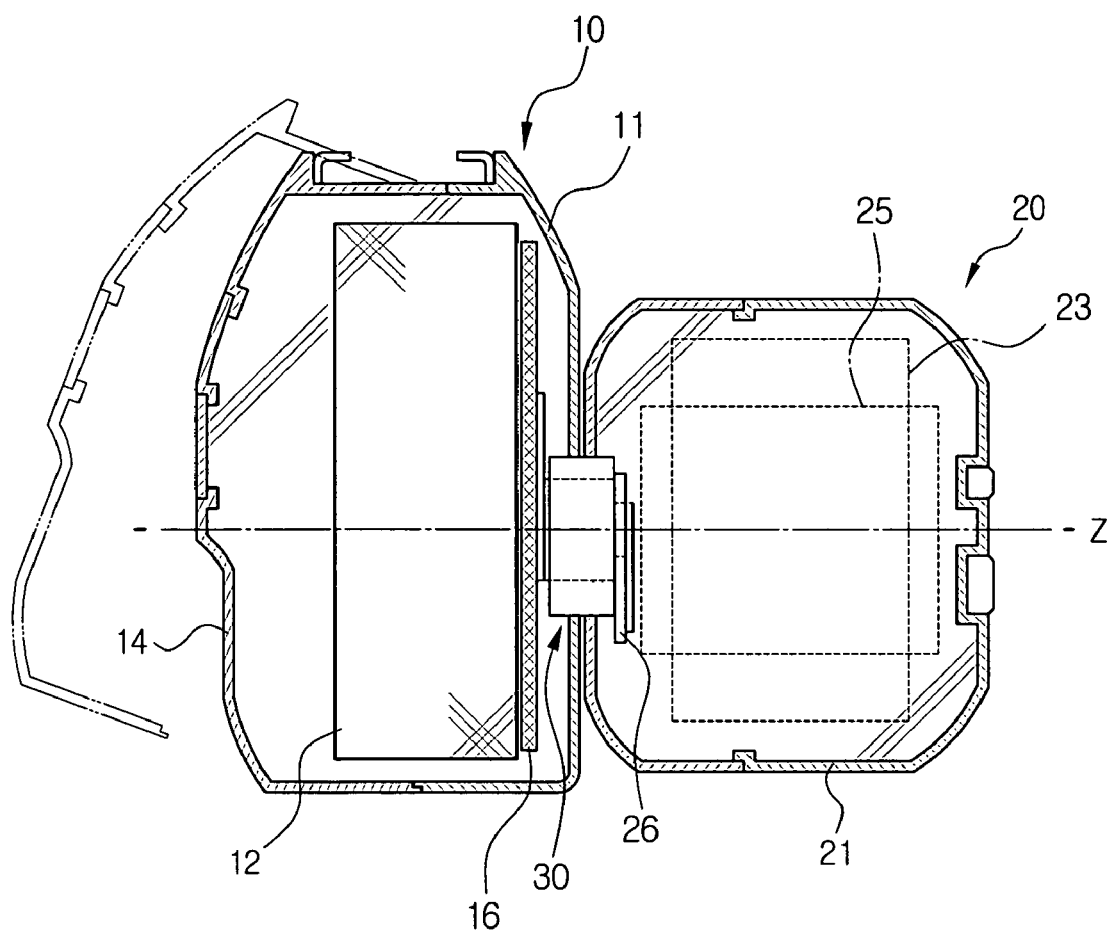
FIG. 2 is a schematic view illustrating the image photographing apparatus according to the preferred embodiment of the present invention.

Referring to FIGS. 1 and 2, an image photographing apparatus according to a preferred embodiment of the present invention is illustrated that includes a body 10, a camera system 20 connected to the body 10, a hinge apparatus 30 for movably connecting the body 10 and the camera system 20 in a rotatable fashion relative to each other, and a signal delivery unit 180.

Inside the body 10 is a main body 11 having a moving deck 12 to record a motion picture, and a sub body 13 protruding from a side of the main body 11. The moving deck 12 is open and closed by a deck door 14 which is movably disposed on the lower portion of the main body 11. Because the moving deck 12 used in the body 10 is well known to those skilled in the art, and is commonly used in a general camcorder, a detailed description of it will be omitted. The main body 11 is also provided with a view finder 15, which displays the image as captured, or images as reproduced. An LCD panel 17 is movably mounted on the sub body 13.

The camera system 20 includes a housing 21 movably disposed on the body 10, and a camera unit housing a plurality of cameras each having a different number of pixels. The housing 21 is rotatably connected to the body 10 by the hinge apparatus 30. Accordingly, the housing 21 is movably connected to the side of the body 10 so that the housing 21 reciprocatingly rotates with respect to a second axis Z within a predetermined angle. The predetermined angle is at or about 270°.

Figure 3:
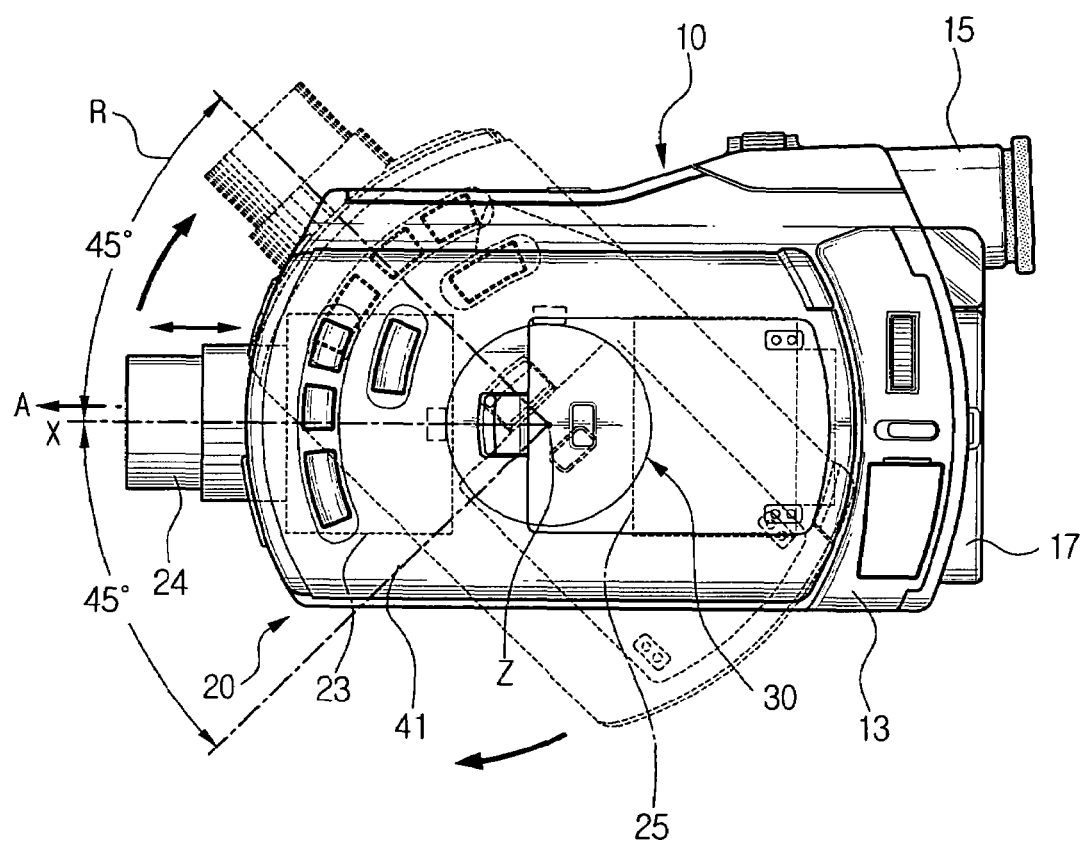
FIG. 3 is a side sectional view of the image photographing apparatus according to the preferred embodiment of the present invention.

As shown in FIG. 3, the camera unit includes a first camera unit 23 that provides a digital still camera (DSC) function, and a second camera unit 25 that provides a digital video camera function. The digital video camera has a fewer amount of pixels than the first camera unit 23 and photographs images including motion pictures.

The first camera unit 23 has the same structure as that of the camera employed in a general digital still camera, and is provided with a zoom lens 24. The second camera unit 25 has the same structure as the photographing unit of a general camcorder. The respective camera units 23, 25 are arranged oppositely to each other with respect to the second axis Z, and photograph in opposite directions. The camera units 23, 25 are driven independently of each other, and when one is in operation, the other one is not in operation. Therefore, which camera unit 23, 25 is in a photographing mode depends upon the position of the housing 21 and a predetermined driving range R. The camera units 23, 25 are exposed to both ends of the housing 21, respectively. According to the an embodiment of the present invention, if the camera unit 23 is positioned within about ±45° with respect to the photographing direction A, it is driven, while the other camera unit 25 is not driven. As shown in FIG. 3, when the first camera unit 23 is in the photographing range R, the control unit receives a signal indicative of the rotational position of the hinge apparatus 30, and thus, subsequently shifts to a 'DSC' mode which photographs still images. The control unit then controls the driving of the first camera unit 23. In the opposite case, the first camera unit 23 is out of the photographing range R and the second camera unit 23 in the range R. A signal indicative of the rotational position of the hinge apparatus 30 is received, and the control unit shifts to a 'DVC' mode which photographs images including motion pictures, and controls the driving of the second camera unit 25.

In the body 10, there also is a main circuit board 16, while a sub circuit board 26 is housed in the housing 21. The main circuit board 16 and the sub circuit board 26 are electrically connected to each other for signal transmission and reception. The sub circuit board 26 is also electrically connected to the first and the second camera units 23, 25. The circuit boards 16, 26 are arranged in parallel with a first axis direction Y, which is orthogonal with respect to the second axis direction Z. With this arrangement, the circuit boards 16, 26 are arranged in the body 10 and the housing 21 efficiently using the spaces, while being easily connected to the signal delivery unit 180.

As shown in FIG. 1, the hinge apparatus 30 is disposed on the connecting area between the housing 21 and the body 10. The hinge apparatus 30 connects the housing 21 to the body 10 so that the housing 21 can rotate in the second axis direction Z. To accommodate the hinge apparatus 30, there are hinge holes 11a, 21a formed in the housing 21 and the main body 11. Each hinge hole 11a, 21a is of the same size and formed in the corresponding position.

Figure 4:
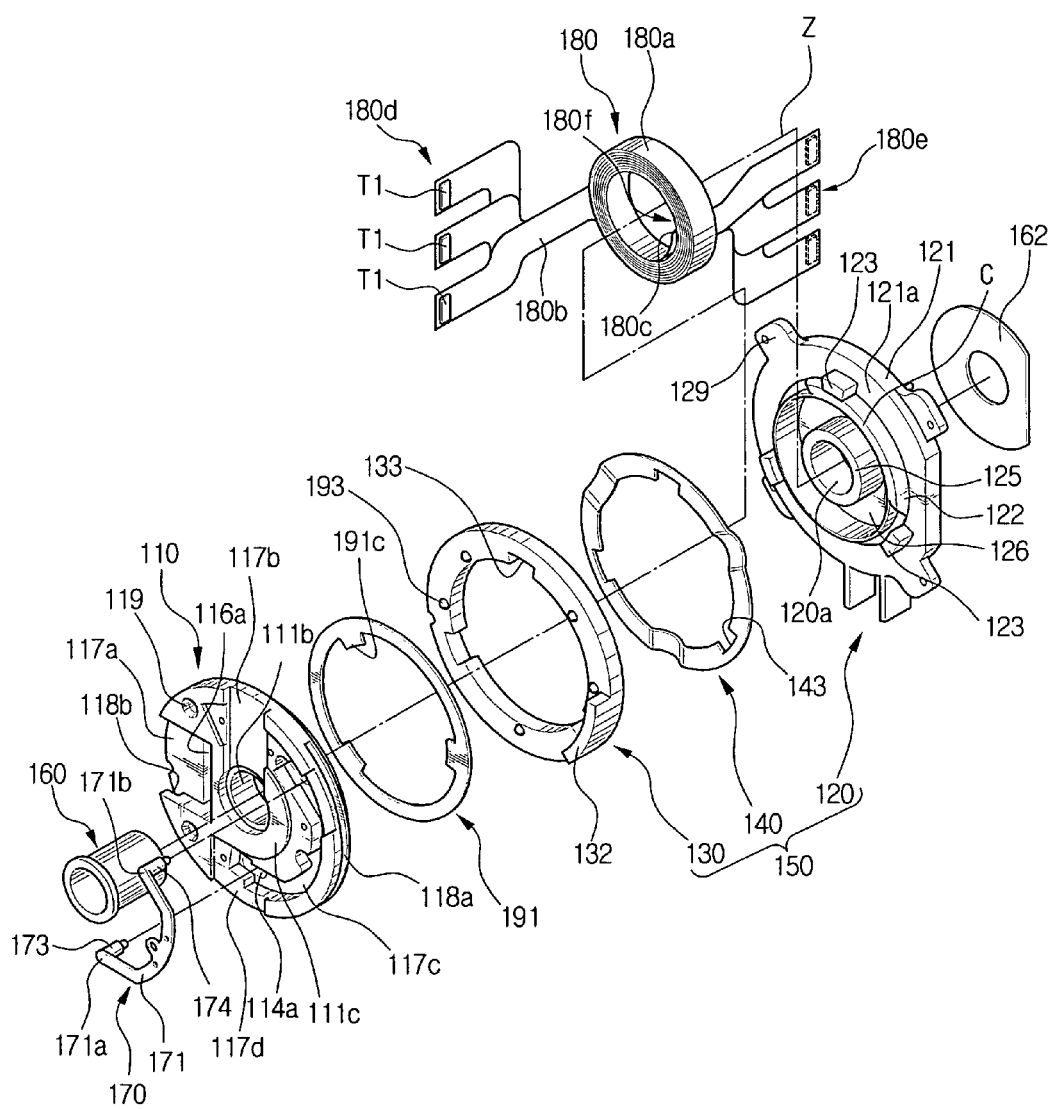
FIGS. 4 and 5 are exploded perspective views of a hinge apparatus according to a preferred embodiment of the present invention.
Figure 5:
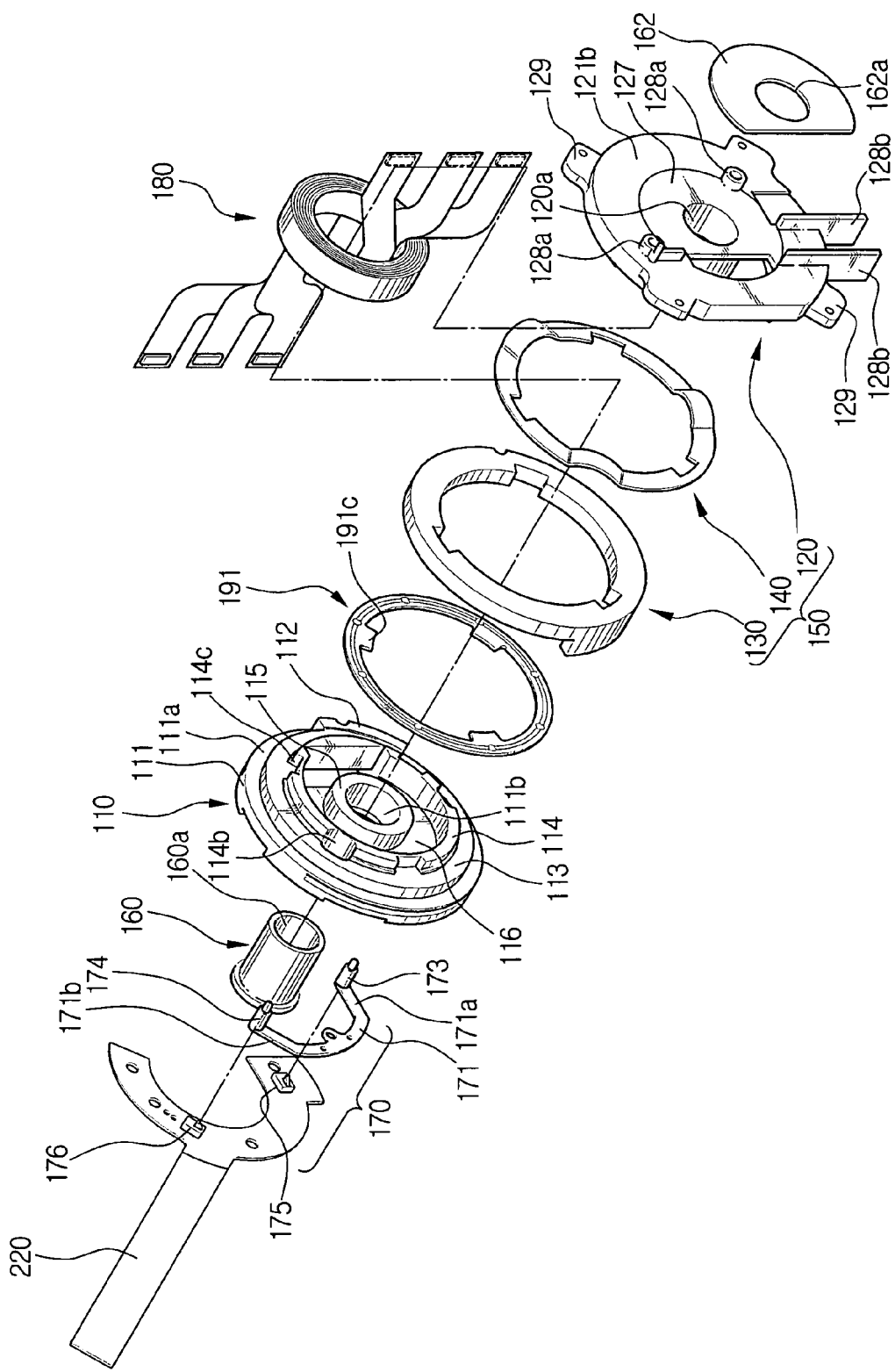

Referring now to FIGS. 4 and 5, the hinge apparatus 30 connects the main body 11 and the housing 21 through the respective hinge holes 11a, 21a, and comprises a fixing bracket 110 secured to the body 10, and a hinge unit 150 secured to the housing 21 and connected to the fixing bracket 110 to rotate within a predetermined angle. The hinge apparatus 30 further comprises a shaft member 160 that connects the fixing bracket 110 and the hinge unit 150 in a manner that the fixing bracket 110 and the hinge unit 150 rotate with respect to each other within a predetermined angle, a sensing unit 170 that senses the rotational position of the hinge unit 150 with respect to the fixing bracket 110 and a signal delivery unit 180 that electrically connects the body 10 with the camera system 20.

The fixing bracket 110 comprises a body 111 passed through the hinge hole 11a and inserted in the main body 11 to be secured therein, and a first locking protrusion 112 formed on a first surface 111a of the body 111. The fixing bracket 110 further comprises a first rib 113 protruding from the first surface 111a to a different circumference from the first locking protrusion 112, and a second rib 114 protruding from the first rib 113.

Figure 6:
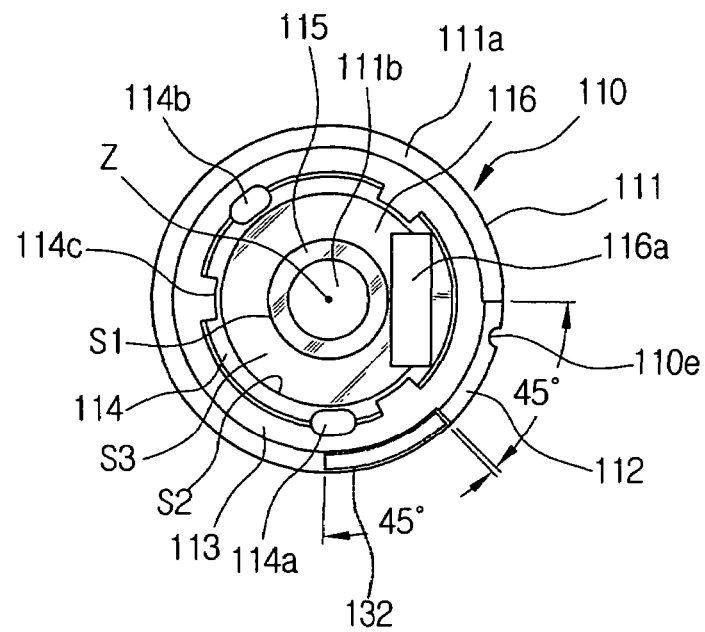
FIG. 6 is a plan view showing the fixing bracket of FIG. 4.

The body 111 has a shaft hole 111b at the center to receive the shaft member 160. A shaft supporter 115 of a predetermined thickness is formed around the shaft hole 111b. The first protrusion 112 restricts the rotational movement of the hinge unit 150 when the first protrusion 112 is rotated with respect to the hinge unit 150. Referring to FIG. 6, the first protrusion 112 is provided at the extreme outer position of the first surface 111a of the body 111, and is formed at approximately 45° with respect to the second axis direction Z. In an embodiment of the present invention, the movement of the first protrusion 112 together with the second protrusion 132 have an angular displacement of approximately 90° with respect to the second axis direction Z. Therefore, the first and the second protrusions 112, 132 preclude rotational movement of the housing 21 for an angle of approximately 90°. Accordingly, the housing 21 is allowed to reciprocatingly rotate 360° less the angular displacement of the respective protrusions 112, 132 (which is approximately 90°). As a result, the housing 21 can rotate within approximately 270°.

The first rib 113 protrudes from the first surface 111a in an annular fashion to a predetermined height, and in an outer diameter smaller than inner diameter of the first protrusion 112.

The second rib 114 protrudes from the first rib 113 in a smaller outer diameter than the first rib 113 and to another predetermined height. Each of the first and the second ribs 113, 114 is either directly or indirectly in contact with the hinge unit 150. The first surface 111a and the first protrusion 112 are in contact with the hinge unit 150.

Between the second rib 114 and the shaft hole 111b, there is an annular hole 116. The annular hole 116 shares the outer circumference of the shaft supporter 115 and the inner surface of the second rib 114 as an inner and an outer surfaces s1, s2, and has a bottom surface s3 between the inner and the outer surfaces s1, s2. A part of the signal delivery unit 180, which is wound a predetermined number of times, is received in the annular hole 116. Enough space is provided between the inner and the outer surfaces s1, s2 so as to allow the wound portion of the signal delivery unit 180 in the annular hole 116 to be wound or unwound a predetermined number of times.

At the bottom surface s3 of the annular hole 116, there is formed a through hole 116a of a suitable size for the signal delivery unit 180 to pass therethrough. The through hole 116a is formed in the fixing bracket 110 in parallel with the second axis Z.

A plurality of recesses 114c is formed on the outer circumference of the second rib 114 to position a click plate 191 (which will be described in greater detail below) and secure it in the determined position. The recesses 114c are formed at irregular intervals with respect to the second axis Z, enabling the click plate 191 to connect only at a predetermined position.

Figure 7:
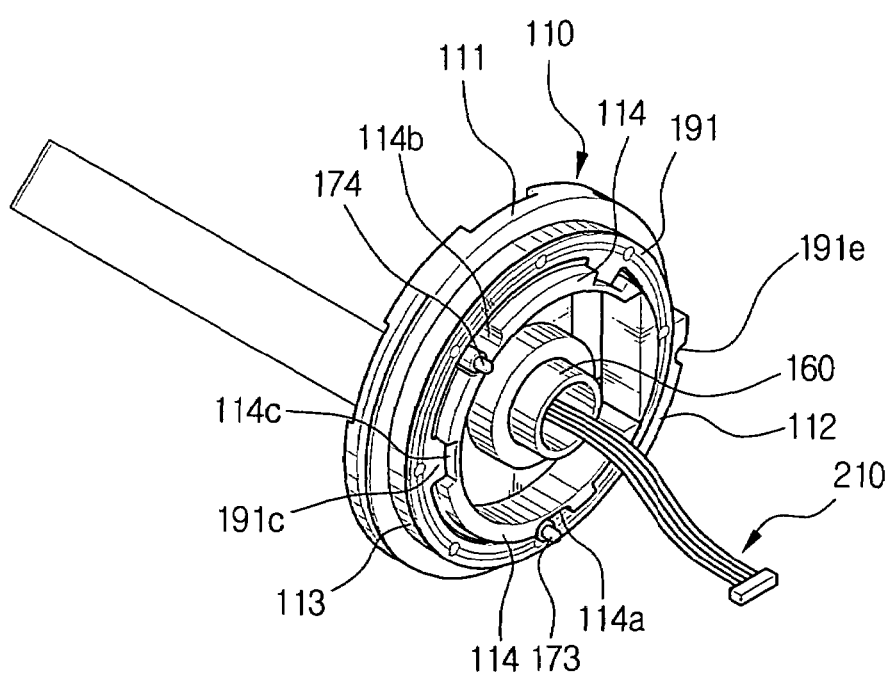
FIG. 7 is a perspective view showing the fixing bracket and the click plate of FIG. 4 being connected.

Additionally, the fixing bracket 110 is provided with a pair of sensing holes 114a, 114b formed in the second surface 111c of the fixing bracket 110. The sensing holes 114a, 114b are formed at predetermined distances from each other, and at a predetermined distance from the second axis Z. As shown in FIG. 7, the cam pins 173, 174 of the sensing unit 170 (which will be described in greater detail below) protrude from the second rib 114 to pass through the sensing holes 114a, 114b.

Referring back to FIG. 4, a first receiving recess 117a is formed on the second surface 111c of the fixing bracket 110 and is in communication with the through hole 116a. The first receiving recess 117a extends from the through hole 116a to the outer circumference of the body 111. The signal delivery unit 180 passes through the through hole 116a and is received in the first receiving recess 117a in a bent state at an angle of approximately 90°. The first receiving recess 117a is formed deeper than the thickness of the signal delivery unit 180.

There is a second receiving recess 117b formed on the second surface 111c of the fixing bracket 110, and is connected with the shaft hole 111b. The second receiving recess 117b receives a signal delivery member 210 after the signal delivery member 210 is passed through the shaft member 160, which is fit in the shaft hole 111b. The second receiving recess 117b extends from the shaft hole 111b to the outer circumference of the body 111, and is formed to have an enough depth so that the signal delivery member 210 can be received in the second receiving recess 117b in a bent state without protruding from the second surface 111c.

Additionally, there is a third receiving recess 117c formed on the first surface 111c of the fixing bracket 110. The third receiving recess 117c includes sensing holes 114a, 114b. The third receiving recess 117c is formed such that it is centered about the second axis Z, and is in fluid communication with the sensing holes 114a, 114b. The sensing holes 114a, 114b receive the sensing unit 170.

A fourth receiving recess 117d is formed on the second surface 111c of the fixing bracket 110 on a higher plane than the third receiving recess 117c. The fourth receiving recess 117d receives a signal cable 220 which connects the sensing unit 170 to the main circuit board 16 inside the body 10. The fourth receiving recess 117b overlaps, in part, with the second receiving recess 117b and formed on a higher plane than the second receiving recess 117b. As a result, the signal cable 220 in the fourth receiving recess 117d supports the signal delivery member 210 in the second receiving recess 117b by tight contact. The fourth receiving recess 117d extends from a side of the third receiving recess 117c to the outer circumference of the body 111.

The fixing bracket 110 further includes a plurality of connecting grooves 118a, 118b formed at the outer circumference of the body 111. Each of the connecting grooves 118a, 118b is formed in a predetermined length in the circumferential direction, and at a predetermined depth toward the rotational axis. Support brackets 51, 53 (described in greater detail below) are fit in to the connecting grooves 118a, 118b. More specifically, as the fixing bracket 110 is passed through the hinge hole 11a of the body 10, the support brackets 51, 53 are fit in the connecting grooves 118a, 118b, and then secured to the inner wall of the main body 11. Accordingly, the fixing bracket 110 is secured to the body 10.

A plurality of screw holes 119 are formed in fluid communication with the connecting groove 118b in the second surface 111c of the body 111. Screws are fastened into the screw holes 119 to fix the support bracket 53 fit in the connecting groove 118b onto the fixing bracket 110.

Figure 8:
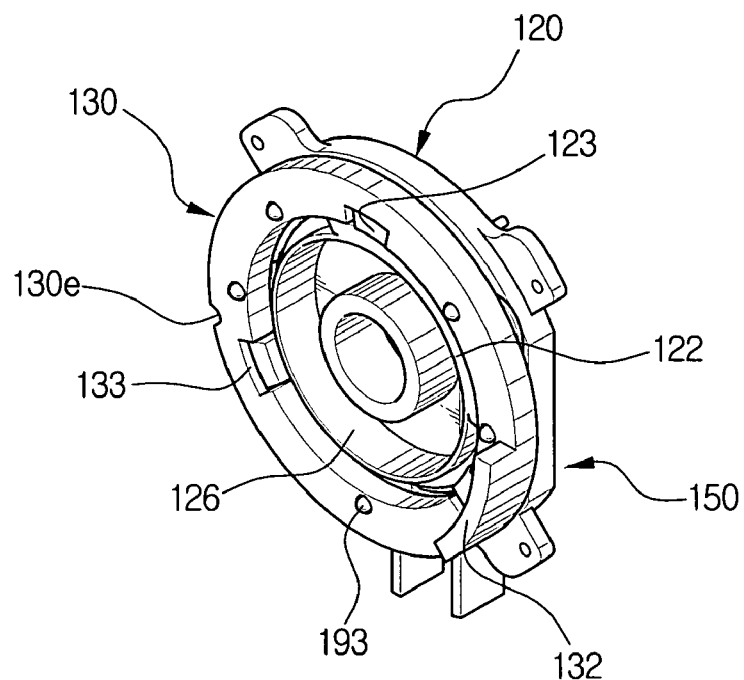
FIG. 8 is a perspective view illustrating the hinge of FIG. 4 being connected.

Referring now to FIG. 8, the hinge unit 150 includes a hinge bracket 120 fixed onto the housing 21, a contact plate 130 connected with the hinge bracket 120 and a plate spring 140 disposed between the hinge bracket 120 and the contact plate 130.

Figure 9:
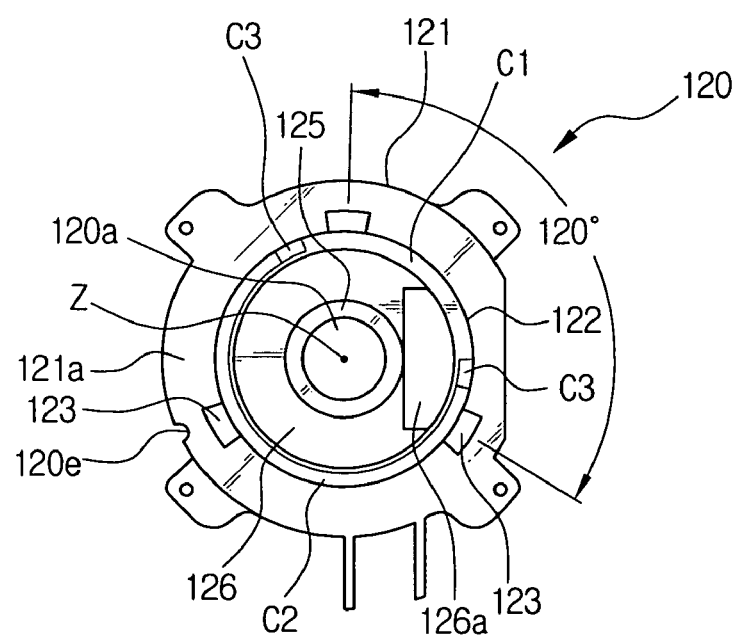
FIG. 9 is a plan view illustrating the hinge bracket of FIG. 4.

Referring to FIG. 9, the hinge bracket 120 includes a body 121 having a shaft hole 120a defined therein to receive the shaft member 160, and an annular rib 122 protruding from the first surface 121a of the body 121. The contact plate 130 and the plate spring 140 are fastened to the annular rib 122 with the inner circumferences thereof being in close contact with the outer circumference of the annular rib 122. Positioning portions are formed respectively on the annular rib 122, the contact plate 130 and the plate spring 140 to enable the complementary connection between the contact plate 130, the plate spring 140 and the annular rib 122. The positioning portion includes a plurality of projections 123 formed on the outer circumference of the annular rib 122 toward the first surface 121a of the hinge bracket 120, and fixing holes 133, 143 formed on the inner circumferences of the contact plate 130 and the plate spring 140 to correspond to the projections 123. The projections 123 and the fixing holes 133, 143 are preferably formed at uniform intervals. For example, three of each fixing holes 133, 143 can be formed, and angularly displaced at approximately 120°. By connecting the contact plate 130 and the plate spring 140 to the hinge bracket 120 with the projections 123 inserted into the fixing holes 133, 143, the hinge bracket 120, the contact plate 130 and the plate spring 140 can be rotated altogether.

Figure 10:
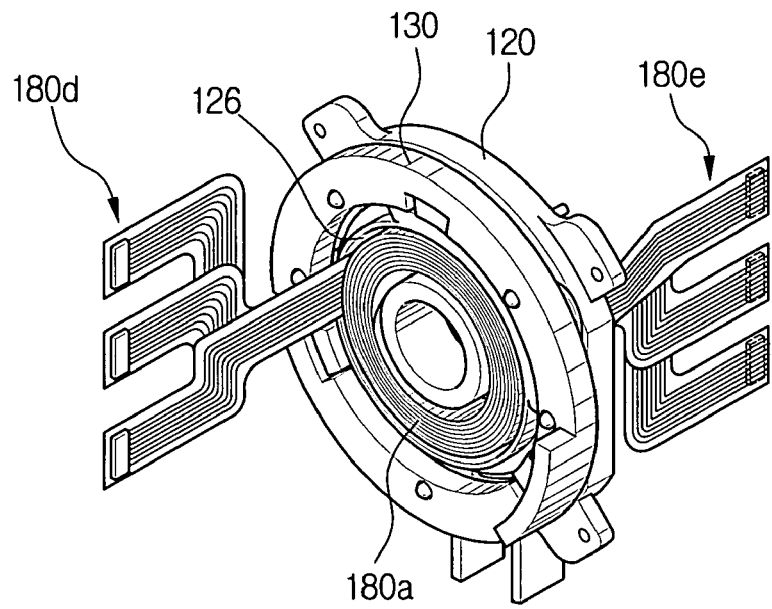
FIG. 10 is a perspective view illustrating the hinge apparatus of FIG. 4 with the signal delivery unit connected.

The hinge bracket 120 additionally includes an annular groove 126 which is defined between the annular rib 122 and the shaft hole 120a. More specifically, the annular groove 126 is defined between the outer circumference of a shaft hole part 125 which has the shaft hole 120a therein, and the inner circumference of the annular rib 122. As shown in FIG. 10, the annular groove 126, like the annular groove 116 of the fixing bracket 110, receives the wound portion of the signal delivery unit 180. Accordingly, it is preferred that the annular groove 126 be in symmetrical configuration with the annular groove 116 of the fixing bracket 110.

A passing hole 126a of a predetermined size is formed in the bottom of the annular groove 126, and the signal deliver unit 180 is passed therethrough. A seating recess 127 for a caulking plate 162 is formed on the second surface 121b of the hinge bracket 120. The seating recess 127 is in fluid communication with the passing hole 126a which penetrates through the hinge bracket 120 caulking The seating groove 127 is formed around the shaft hole 120a to a predetermined depth and is substantially circular. The caulking plate 162 is seated on the seating recess 127 and is connected with the shaft member 160.

The caulking plate 162 is connected to an end of the shaft member 160 which is passed through the shaft holes 111b, 120a of the fixing bracket 110 and the hinge bracket 120, to prevent separation of the shaft member 160 and securely connect the fixing bracket 110 and the hinge unit 150. Accordingly, as the shaft member 160 is received in the fastening hole 162a of the caulking plate 162, the end of the shaft member 160 is caulked and thus secured in position. The shaft member 160 has a tubular shape with a hollow hole 160a formed therein for the signal delivery member 210 to pass through. The signal delivery member 210 includes approximately 10 signal lines for high capacity electric signals that can be transmitted by the signal delivery unit 180. The signal lines of the signal delivery member 210 are usually provided in a bundle. The signal delivery member further includes a power line.

A plurality of supporting bosses 128a are formed on the second surface 121 of the hinge bracket 120. Some of the supporting bosses 128a have screw holes therein. The sub circuit board 26, which is electrically connected with the signal delivery unit 180, is seated on the supporting bosses 128a and fastened by screws.

A pair of aligning ribs 128b protrudes from the second surface 121a of the hinge bracket 120 in parallel to align the signal delivery member 210 which passes through the shaft hole 120a. The aligning ribs 128b extend from the outer circumference of the body 121 to a height preferably the same as the supporting bosses 128a. As a result, the sub circuit board 26 is supported by contact with the supporting bosses 128a and the aligning ribs 128b. There is predetermined space between the second surface 121a of the hinge bracket 120 and the sub circuit board 26, allowing the signal delivery unit 180 and the signal delivery member 210 to pass through without interruption.

A plurality of fixtures 129 protrudes from the outer circumference of the body 121 at predetermined intervals. Each fixture 129 has a screw hole defined therein. The hinge bracket 120 is secured to the housing 21 through use of screws fastened into the screw holes. Some of the fixtures 129 are formed at the same height as the first surface 121a of the body 121, while the others are formed at the same height as the second surface 121b. Preferably, the fixtures 129 can be formed in the second axis Z, with equal heights and in symmetrical relation with each other., The fixtures 129 can then be used to make fastening to the housing 21 more efficient and secure. This will be described in greater detail below.

A cam surface C, with a variable height, is provided to an upper end of the annular rib 122 along the circumference of the annular rib 122, to detect the movement range of the fixing bracket 110 that rotates. In reference to FIGS. 8 and 9, the cam surface C includes an operating surface C1 formed by a predetermined length at substantially the same height as the annular rib 122, a non-contact surface C2 formed on a lower plane than the operating surface C1 but also with a predetermined length, and an inclined surface C3 connecting the operating surface C1 and the non-contact surface C2. The operating surface C1 faces the second rib 114 of the fixing bracket 110 in contact therewith. Accordingly, as cam pins 173, 174 protrude through the sensing holes 114a, 114b of the second rib 114, the cam pins 173, 174 are pushed backward by contact with the operating surface C1. Because the non-contact surface C2 is formed on a lower plane than the operating surface C1 to face but also remain spaced apart from the second rib 114 at a predetermined distance, the cam pins 173, 174 are not in contact with the non-contact surface C2. The inclined surface C3 guides the cam pins 173, 174 therealong. With respect to a circle having the second axis Z as a center, the operating surface C1 is formed to cover a length corresponding to a predetermined angle. Therefore, the operating surface C1 is formed at a predetermined length in consideration of the interval between the cam pins 173, 174 so that only one of the cam pins 173, 174 can be contacted and operated therealong. Accordingly, the length of the operating surface C1 determines the movement range of the selected one of the cam pins 173 174, and the operation mode of the first and the second camera units 23, 25 are determined and maintained in the determined movement range.

Figure 11:
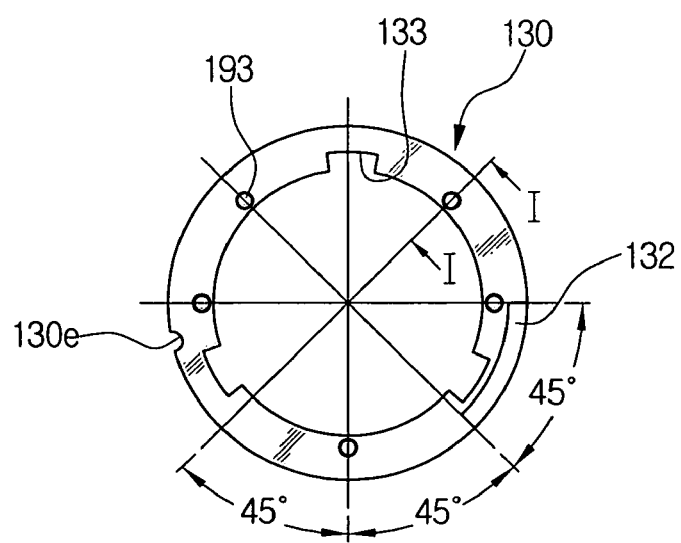
FIG. 11 is a plan view illustrating the contact plate of FIG. 4.

As shown in FIG. 8, the contact plate 130 fits in the annular rib 122 to face the first surface 121a of the body 121. Accordingly, the contact plate 130 has an inner circumference corresponding to the outer circumference of the annular rib 122 of the contact plate 130, and has the same, or smaller outer diameter when compared to that of the fixing bracket 110. On the surface of the contact plate 130 facing the fixing bracket 110, there is a second locking protrusion 132 corresponding to the first locking protrusion 112. Referring to FIG. 11, the second locking protrusion 132 is formed at the extreme outer side of the contact plate 130. As described above, the second locking protrusion 132 is locked in the first locking protrusion 112 to limit the rotational movement range of the housing 21 with respect to the body 10. In this embodiment of the present invention, the second locking protrusion 132, together with the first locking protrusion 112, has an angular displacement of approximately 90°, which limits rotational movement of the housing 21. Preferably, each of the first and second locking protrusions 112, 132 covers approximately 45°. The second locking protrusion 132 can protrude to the same plane as the first locking protrusion 112, is in contact with, and faces, the first surface 111a of the fixing bracket 110.

The plate spring 140 is preferably made of metal material which can be compressed and decompressed in the direction of second axis Z, to urge the contact plate 130 toward the fixing bracket 110. The fixing bracket 110 in its normal state is inhibited from rotating with respect to the hinge unit 150 and can be rotated by a predetermined torsion force overcoming the frictional force.

The hinge apparatus 30 further includes a click force providing unit disposed between the fixing bracket 110 and the contact plate 130 to provide a predetermined click at predetermined intervals during the rotation of the housing 21 with respect to the body 10. The click force providing unit includes a click plate 191 connected to the fixing bracket 110 and a plurality of click balls 193 arranged between the click plate 191 and the contact plate 130.

Figure 12:
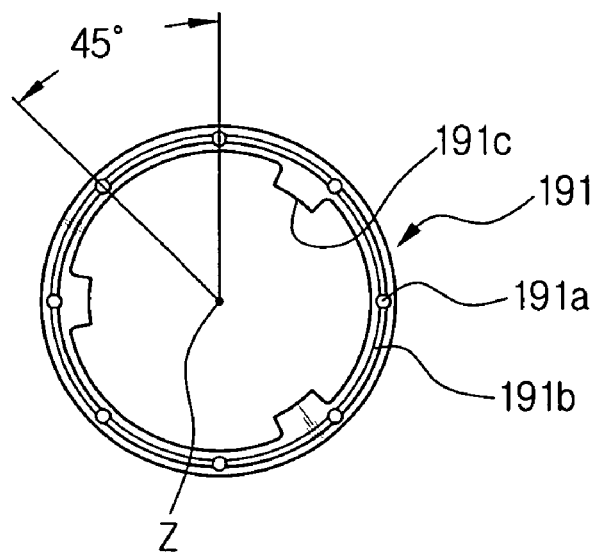
FIG. 12 is a plan view illustrating the clock plate of FIG. 4.

The click plate 191 is preferably made of metal material and formed to a ring shape. On the side of the click plate 191 facing the contact plate 130, a plurality of click holes 191a are formed. As shown in FIG. 12, the click holes 191a are arranged at predetermined angles with respect to the center of second axis Z. In the embodiment of the present invention, the click holes 191a are arranged in intervals of approximately 45°. The click balls 193 are clicked into the click holes 191a. Accordingly, as the click plate 191 is rotated, the click balls 193 are repeatedly clicked in and out of the click holes 191a. The click plate 191 further includes a guide groove 191b connecting the click holes 191a. More specifically, the guide groove 191b guides the click balls 193 rolling between the click holes 191a. The guide groove 191b is formed on a higher plane than the click holes 191a.

Referring to FIG. 7, the click plate 191 of the above-described construction is secured in the second rib 114 and seated on the first rib 113 of the fixing bracket 110. The click plate 113 and the second rib 114 are respectively provided with a positioning portion to determine respective connection positions and secure the click plate 113 and the second rib 114 in the determined connecting positions. The positioning portion includes a plurality of positioning holes 114c formed on the outer circumference of the second rib 114 at predetermined intervals, and a plurality of positioning protrusions 191c formed on the inner circumference of the click plate 191 to correspond to the positioning holes 114c. The positioning holes 114c and the positioning protrusions 191c are formed at irregular intervals. Because the position of the click holes 191a are determined during the initial connection of the click plate 191 with respect to the fixing bracket 110, the 'clicking' occurs at predetermined positions. For example, positioning can be made properly with respect to the cam pins 173, 174 so that clicking can occur in every on/off switching of modes between DVC and DSC modes.

Figure 13:
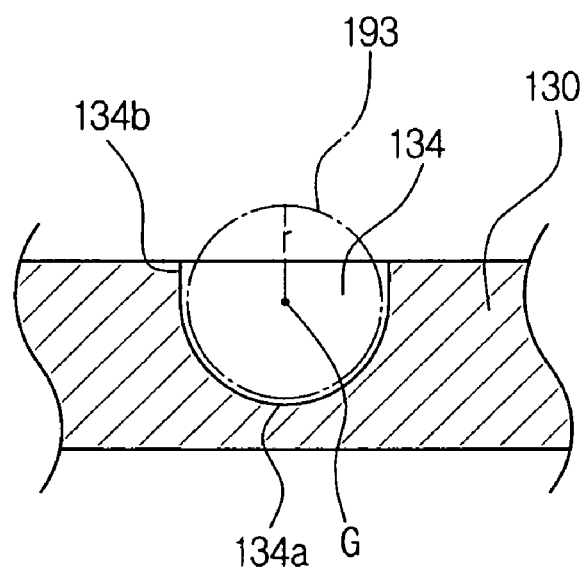
FIG. 13 is a sectional view taken on line I-I of FIG. 11.

The click balls 193 are preferably made of a metal material, corresponding to the click holes 191a respectively. As shown in FIG. 13, the click balls 193 protrude from a surface of the contact plate 130 for rolling motion. To accomplish the rolling motion, the click ball recesses 134 are formed on the surface of the contact plate 130 with a radius r wider than that of the click balls 193. Accordingly, the click balls 193 can be seated with the center of gravity G stabley positioned in the click ball recesses 134. Therefore, the click balls 193 are not easily dislodged from the click ball recesses 134. Preferably, lubricating oil is applied to the click ball recesses 134 for smooth rolling of the click balls 193. Each click ball recess 134 includes a spherical surface 134a on which the click ball 193 is closely seated. An upright cylindrical surface 134b is formed at the entry part of the click ball recess 134. Due to this structure, the click balls 193 can be easily inserted in the click ball recesses 134.

As shown in FIG. 11, the click balls 193 are selectively arranged around the second axis Z and along a surface of the contact plate 130 at an interval of approximately 45°. Preferably, the click balls 193 are not arranged on the contact plate 130 where the fixing holes 133 are formed.

In order to make sure that the clicking occurs in the correct positions, the clicking positioning portions are provided to the fixing bracket 110, the hinge bracket 120 and the contact plate 130, respectively. The clicking positioning portions include positioning slits 110e, 120e, 130e formed in the respective outer circumferences of the fixing plate 110, the hinge bracket 120 and the contact plate 130. When the clicking positioning portions are assembled, as shown in FIG. 8, the hinge bracket 120 and the contact plate 130 are first assembled with each other, with the hinge bracket slit 120e and contact plate slit 130e being aligned with each other and the plate spring 140 being interposed therebetween. The fixing bracket 110 is then placed in contact with the contact plate 130 and with the hinge bracket slit 120e, and the contact plate slit 130e is aligned with the fixing bracket slit 110e. Accordingly, the respective click balls 193 and the click holes 191a are docked in the intended positions, whereby the clicking action can occur. The cam pins 173, 174 of the sensing unit 170 (described in greater detail below) and the cam surface C can also be made to align with each other in assembling process.

The sensing unit 170 is provided to the fixing bracket 110 and/or the hinge unit 150 to sense the relative rotation of the hinge unit 150 with respect to the fixing bracket 110. Accordingly, the above-mentioned 'photography mode' is determined based on the sensing signal from the sensing unit 170. The sensing unit 170 includes an elastic piece 171 disposed on the second surface 111c of the body 111 of the fixing bracket 110, a pair of cam pins 173, 174 disposed on both ends 171a, 171b of the elastic piece 171, and a pair of switches 175, 176 provided to the positions corresponding to the cam pins 173, 174.

The elastic piece 171 is preferably made of a metal material, and is inserted in the third receiving recess 117c of the first surface 111a of the body 111. The elastic piece 171 is secured onto the bottom of the third receiving recess 117c, approximately at the middle portion thereof by proper fasteners such as screws. Both ends 171a, 171b of the elastic piece 171 remain as free ends to allow for elastic deformation and recovery.

Referring to FIG. 7, the cam pins 173, 174 are supported on both ends 171a, 171b of the elastic piece 171, and protrude towards the first surface 111a of the body 111 through the sensing holes 114a, 114b formed in the body 111. Cam pins 173, 174 are positioned to protrude through the section of the second rib 114 having the sensing holes 114a, 114b therein, and thus face the cam surface C of the hinge bracket 120. Accordingly, if any one of the cam pins 173, 174 contacts the operating surface C1 of the cam surface C during rotation of the hinge bracket 120, the contacting cam pin 173, 174 is pushed backward to elastically deform one end of the elastic piece 171 and move backward together with the end of the elastic piece 171. As the backwardly moving end of the elastic piece 171 contacts the corresponding switch 175, 176, the switch 175, 176 generates on signal.

The pair of switches 175, 176 are arranged on both ends 171a, 171b of the elastic piece 171 facing each other and at a predetermined distance from each other. The switches 175, 176 are supported by the signal cable 220 which is mounted in the fourth receiving recess 117d. In one embodiment of the present invention, the signal cable 220 can be a flexible flex-print cable (FPC) supporting the switches 175, 176, and also connecting the switches 175, 176 to the main circuit board 16 of the body 10. The signal cable 220 is also mounted in the fourth receiving recess 117d by proper fasteners, such as screws.

The signal delivery unit 180 electrically connects a first member with a second member which is rotatably disposed with respect to the first member, to enable transmission of signal between the first element and the second element. In one embodiment of the present invention, the body 10 can be the first member and the camera system 20 be the second member.

Figure 14A:
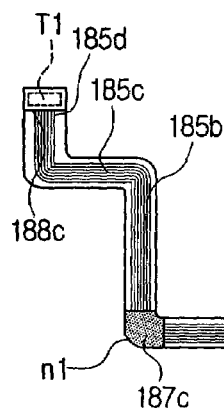
FIGS. 14A through 14C are plan views illustrating the components of the signal delivery unit of FIG. 4 separately.
Figure 14A:
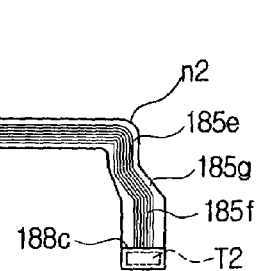
Figure 14B:
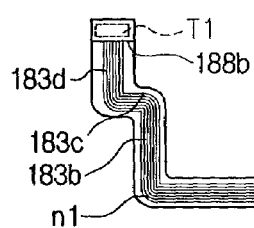
Figure 14B:
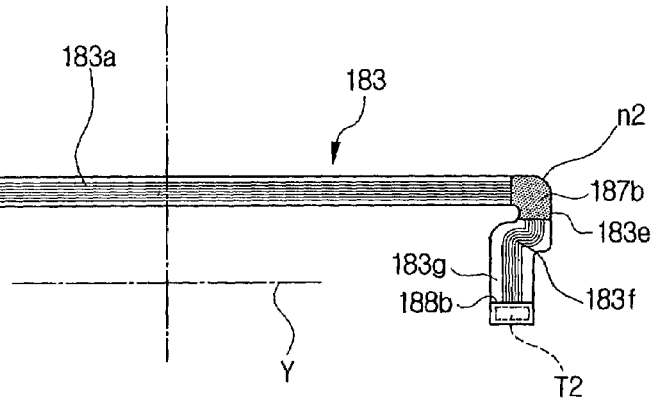
Figure 14C:
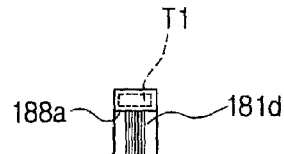
Figure 14C:
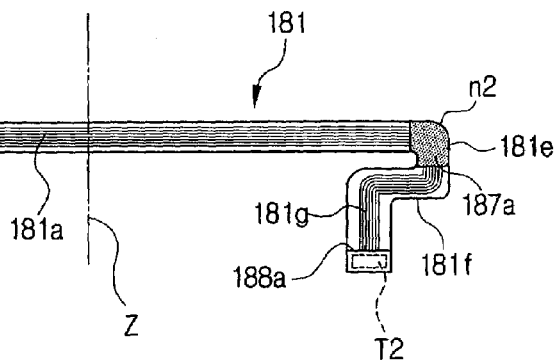

The signal delivery unit (cable bundle) 180 is a cable bundle having a plurality of signal cables therein and as shown in FIGS. 14A-C, the signal delivery unit 180 includes a first, second and third signal cables 181, 183, 185 of different lengths. The cable bundle 180 includes a winding portion 180a (FIG. 17), where the first, the second and the third signal cables 181, 183, 185 are in-part nested on one another, and a first and a second extension 180b, 180c (shown in FIG. 16) extending in parallel to the second axis Z of the winding portion 180a and to both sides. The cable bundle 180 further includes a first branch 180d (FIG. 16) extending from the first extension 180b with respect to signal cables 181, 183, 185, a second branch 180e extended from the second extension 180c with respect to the respective signal cables 181, 183, 185, and a first and second connectors T1, T2 respectively supported on the first and the second branches 180d, 180e.

The number of windings that can be made in the winding portion 180a is preferably and approximately 3.5 times, and the winding portion 180a is disposed in the hinge apparatus 30 in a releasable and rewindable manner for a predetermined angle. The winding portion 180a allows relative rotation of the fixing bracket 110 with respect to the hinge assembly 150 of an angle of approximately at 270°. The winding portion 180a is received in the annular hole 116 of the fixing bracket 110 and in the annular groove 126 of the hinge bracket 120. Further, the winding portion 180a has a shaft hole 180f (shown in FIG. 16) in the center thereof for the respective shaft supporters 115, 125.

Figure 15:
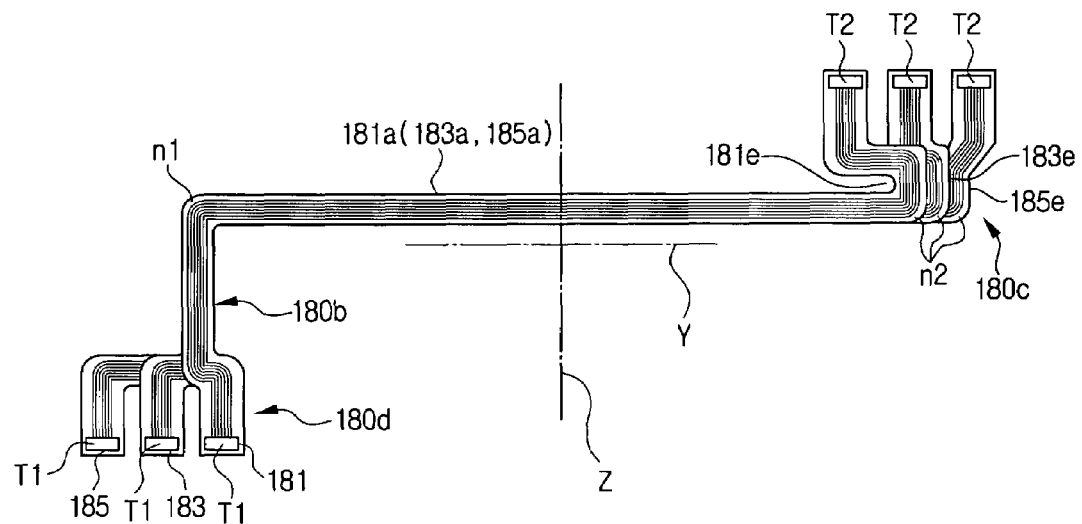
FIG. 15 is a plan view illustrating the components of the signal delivery unit of FIGS. 14A-C nested on one another.
Figure 16:
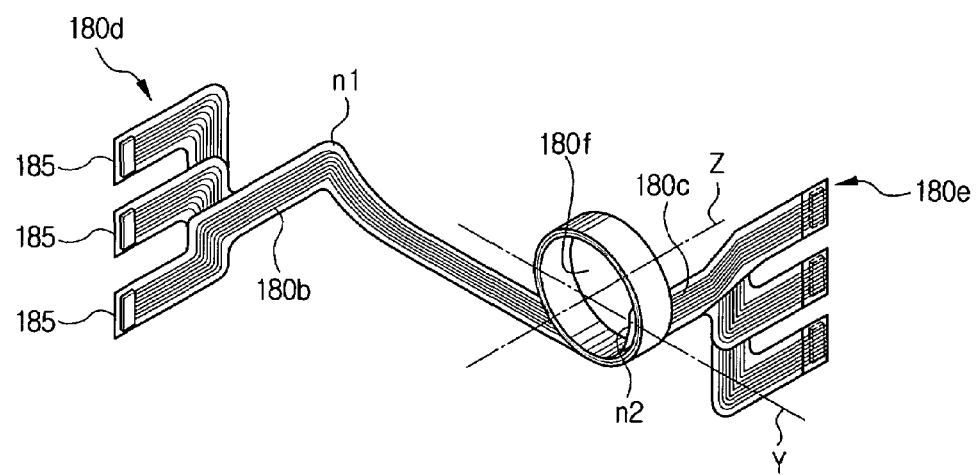
FIG. 16 is a perspective view illustrating a method for winding the nested signal deliver unit of FIGS. 14A-C.
Figure 17:
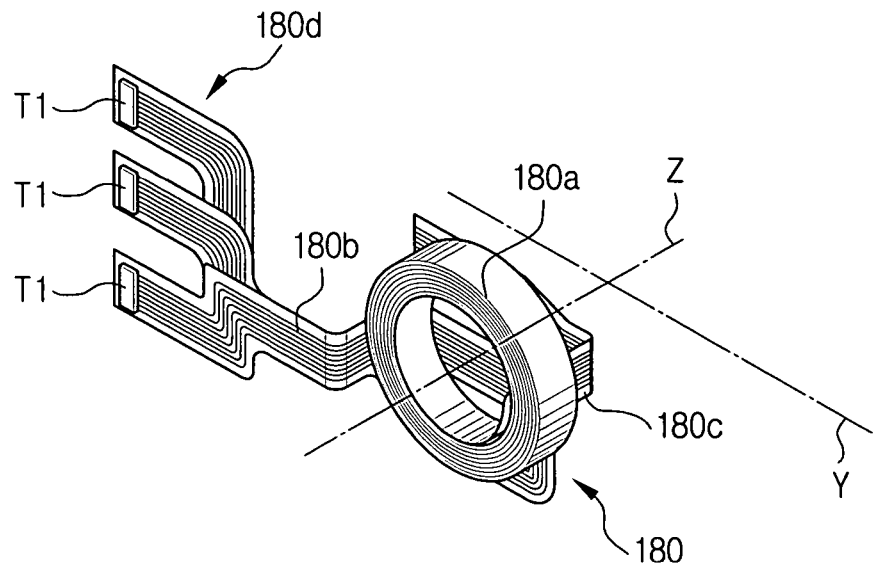
FIG. 17 is a perspective view illustrating the posture of the nested signal delivery unit in the image photographing apparatus according to a preferred embodiment of the present invention.
Figure 18:
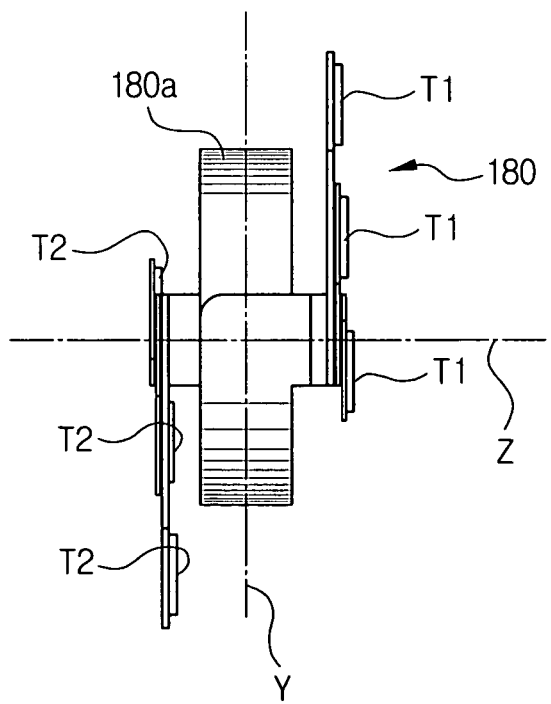
FIG. 18 is a sectional view of the nested signal delivery unit illustrated in FIG. 17 viewed from a side.
Figure 19:
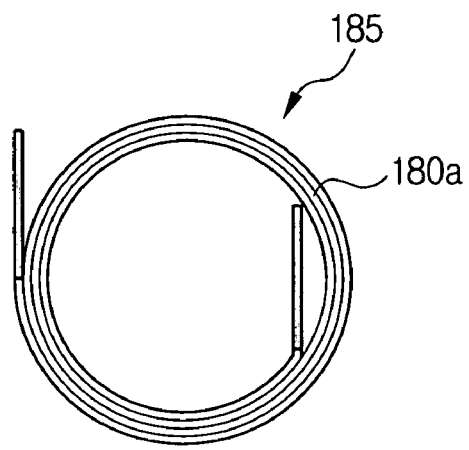
FIG. 19 is a sectional view illustrating winding portion of the nested signal delivery unit of FIG. 17.

Referring to FIGS. 15 and 16, the winding portion 180a is formed by nesting (or laying one on top of the other) straight portions 181a, 183a, 185a of the signal cables 181, 183, 185, and then wound, preferably 3.5 times. Accordingly, the innermost straight portion of the first signal cable 181, i.e., the first straight portion 181a is the shortest, followed by the interposed (or second) straight portion 183a and then the outermost (or third) straight portion 185a, respectively. When the first, second and third straight portions 181a, 183a, 185a are overlain on one another, the two corners n1, n2 of the respective straight portions 181a, 183a, 185a are aligned with one another. The 'corners' denote the bent areas of the straight portions 181a, 183a, 185a which are bent to 90° with respect to the second axis Z. The corners can also be referred to as "bending portions". After the signal cables 181, 183, 185 are wound approximately 3.5 times, the winding portion 180a is spiral shaped with a hollow space (180F) defined therein. FIG. 15 is a plan view illustrating the respective signal cables 181, 183, 185 being turned upside down from the state as shown in FIGS. 14A-C.

Figure 21:
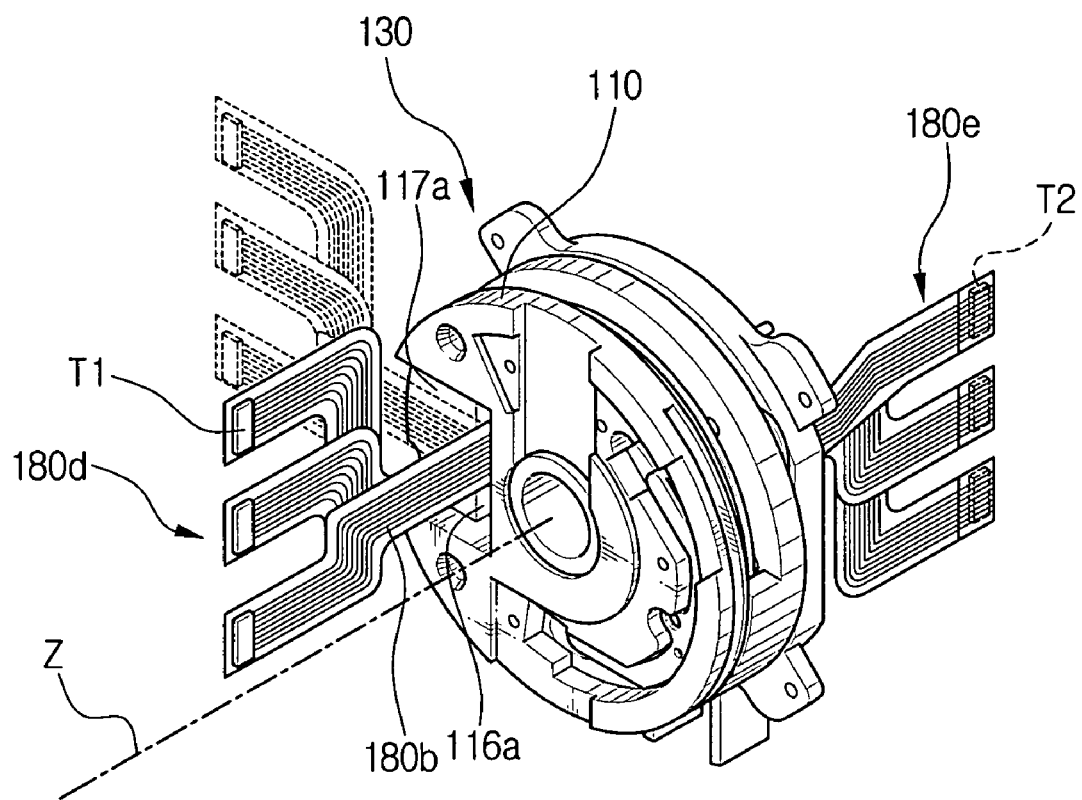
FIG. 21 is a perspective view illustrating the nested signal delivery unit being assembled to the hinge apparatus according to a preferred embodiment of the present invention.

As shown in FIG. 21, the first extension 180b is inserted into the body 10 through the through hole 116a of the fixing bracket 110. The first extension 180b as inserted is then bent as indicated by the phantom line approximately to 90° at the bending portion n1 to be substantially perpendicular to the second axis Z, and also to be in close contact with the first receiving recess 117a. The first extension 180b includes the first extensions 181b, 183b, 185b nesting on one another, which are bent at the first bending portion n1 of the signal cables 181, 183, 185 at an angle of approximately 90°. The first extensions 181b, 183b, 185b of the signal cables 181, 183, 185 are formed in the same length and width.

The first branch 180d is branched from the first extension 180b according to the respective signal cables 181, 183, 185. The first branch 180d includes first connections 181d, 183d, 185d for supporting the first connector T1 on the ends thereof, and first split-extensions 181c, 183c, 185c for connecting the first connections 181d, 183d, 185d with the first extensions 181b, 183b, 185b. The first connections 181b, 183b, 185b are substantially parallel to the rotational axis Z, i.e., the second axis, and at a predetermined interval. The first connections 181d, 183d, 185d are connected to the body 10, i.e., to the main circuit board 16. Further, in order to connect the first connections 181d, 183d, 185d at the predetermined interval to the first extensions 181b, 183b, 185c, the first split extensions 181c, 183c, 185c are extended from the first extensions 181b, 183b, 185b to different lengths and substantially parallel to a first axis Y which crosses the second axis Z.

Figure 22:
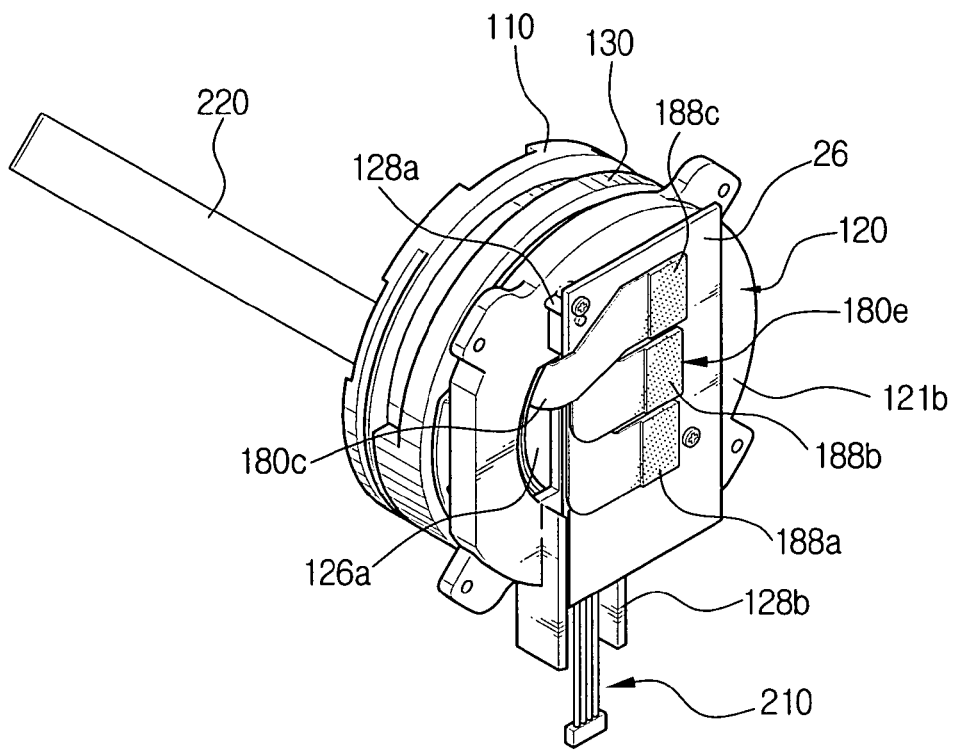
FIG. 22 is a perspective view illustrating a sub-circuit board being assembled to the hinge apparatus according to a preferred embodiment of the present invention.

Meanwhile, the second extension 180c is extended substantially parallel to the first extension 180b, but to the opposite direction, and entered into the housing 21 through the passing hole 126a of the hinge bracket 120 (see FIG. 22). The second extension 180c is shorter in length than the first extension 180b. This is because the sub circuit board 26 is directly assembled to the hinge bracket 120, and the sub circuit board 26 is smaller in size than the main circuit board 16. Accordingly, the second extension 180c is sized to be shorter than the first extension 180b, and is bent approximately 90° immediately after the first extension 180b passes out of the passing hole 126a so that the first extension 180b can contact the sub circuit board 26.

As shown in FIG. 15, the second extension 180c includes second extensions 181e, 183e, 185e of the respective signal cables 181, 183, 185 which are nested on one another and bent from the second bending portion n2 by approximately 90°. The second extensions 181e, 183e, 185e have the same length in the second axis Z.

The second branch 180e is branched from the second extensions 181e, 183e, 185e of the respective signal cables 181, 183, 185 at a predetermined interval. The second branch 180e includes second connections 181g, 183g, 185g parallel with the first connections 181d, 183d, 185d at predetermined intervals, and second split extensions 181f, 183f, 185f for connecting the second connections 181g, 183g, 185g and the second extensions 181e, 183e, 185e. The second extensions 181g, 183g, 185g have the same length, and are connected to the camera system 20, i.e., to the sub circuit board 26.

The second split extensions 181f, 183f, 185f are extended from the second extensions 181e, 183e, 185e in different lengths and in a direction that crosses the second axis Z to connect to the second connections 181g 183g, 185g.

The first connector T1 is provided to the respective ends of the first connections 181d, 183d, 185d, with each being exposed. When the cable bundle 180 is assembled, the first connectors T1 are arranged substantially perpendicular with respect to the first axis Y. The first connectors T1 are electrically connected to the main circuit board 16.

Additionally, the second connectors T2 are provided to the ends of the second connections 181g, 183g, 185g, with each also being exposed. The second connectors T2 are arranged substantially perpendicular with respect to the second axis Y, and electrically connected to the sub circuit board 26. The first and the second connectors T1, T2 are exposed to the same plane of the signal cables 181, 183, 185 so as to face the same direction.

The signal cables 181, 183, 185 constructed as above are preferably a flexprint cable (FPC) which has signal lines on both sides thereof. For example, 20 signal lines are provided to the signal cables 181, 183, 185, respectively, so that the image signals captured by the camera units 23, 25 are transmitted through the signal lines.

Figure 20:
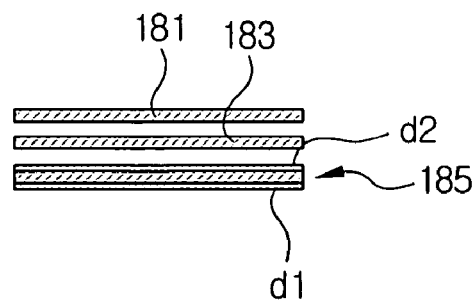
FIG. 20 is a sectional view illustrating straight portions of the nested signal delivery unit of FIG. 15.

One of the signal cables 181, 183, 185 can be formed with a larger thickness than the others. For example, as shown in FIG. 20, the third signal cable 185 can be formed thicker than the other signal cables 181, 183. To make signal cable 185 thicker than the others, coating layers d1, d2 of a preferred material are provided to both sides of the third signal cable 183. Preferably, the material used for the coating layers d1, d2 can be a material that is effective to substantially block the influence of noise and magnetic fields. For example, $d_1$ and $d_2$ can be made up of a plastic shielding material, such as PVC. Accordingly, noise generated by the electric signals which are created by the magnetic field at the winding portion 180a can be reduced.

Furthermore, the thickest signal cable 183 may be connected so as to transmit a DSC signal, i.e., motion picture signals.

Referring again to FIGS. 14A-C, first reinforcement members 187a, 187b, 187c of predetermined thickness can be provided to one of the bending portions n1, n2 of the respective signal cables 181, 183, 185. The first reinforcement members 187a, 187b, 187c are slimmer in thickness than the signal cables 181, 183, 185, and can be joined by a chemical bond (i.e., glue). Preferably, the first reinforcement members 187a, 187b, 187c can be a film made of PVC. In an embodiment of the present invention the reinforcement members 187a, 187b, 187c can be provided to one or both of the bending portions n1, n2 of the signal cables 181, 183, 185. However, as one skilled in the art can appreciate, such an exemplary embodiment should not be considered as a limiting one, as many different configurations are possible. The first reinforcement members 187a, 187b, 187c prevent the bending portions n1, n2 from deformation and breakage, and also from peeling off by the friction from the contact with the hinge apparatus 30.

Preferably, each signal cable 181, 183, 185 has a thickness ranging from at or about 0.15 mm to about 0.24 mm. Each first reinforcement member has a preferred thickness from at or about 0.12 mm to about 0.13 mm. Preferably, the first and the second signal cables 181, 183 can have a thickness from at or about 0.15 mm to about 0.17 mm, while the third signal cable 185 can have a thickness from at or about 0.22 mm to about 0.24 mm.

Second reinforcement members 188a, 188b, 188c are provided to both ends of the respective signal cables 181, 183, 185. The second reinforcement members 188a, 188b, 188c are provided opposite to the connectors T1, T2. By use the second reinforcement members 188a, 188b, 188c, connections between the connectors T1, T2 and the signal lines are secured, and both ends of the signal cables 181, 183, 185 are prevented from deformation. Preferably, the second reinforcement members 188a, 188b, 188c are made of a material such as a PVC, and are thicker than the signal cables 181, 183, 185, preferably having a thickness from at or about 0.4 mm to about 0.5 mm.

Figure 23:
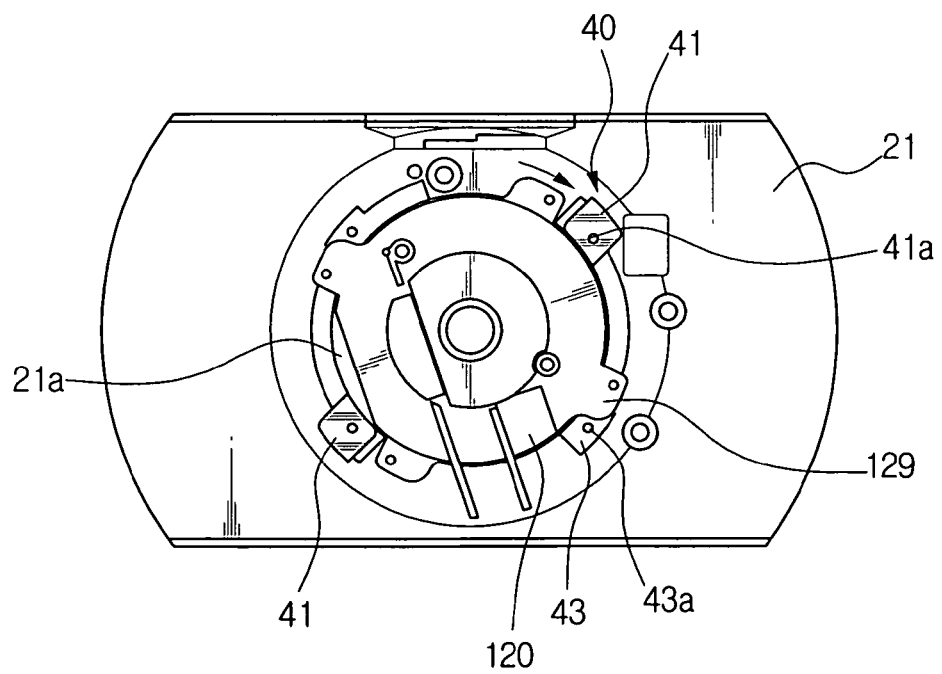
FIG. 23 is a plan view illustrating the status of the hinge apparatus prior to it being assembled into the housing.
Figure 24:
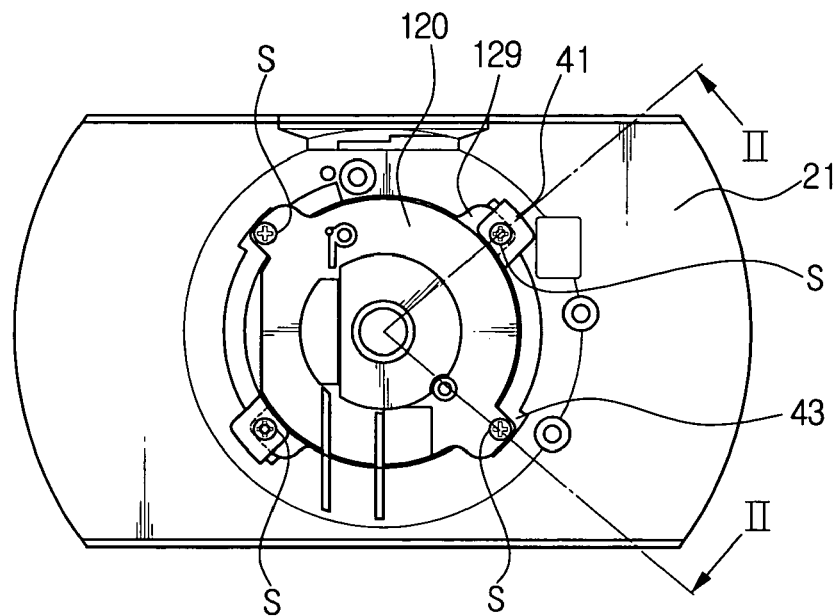
FIG. 24 is a plan view illustrating the assembling status of the hinge apparatus after it is rotated from the position of FIG. 23.
Figure 25:
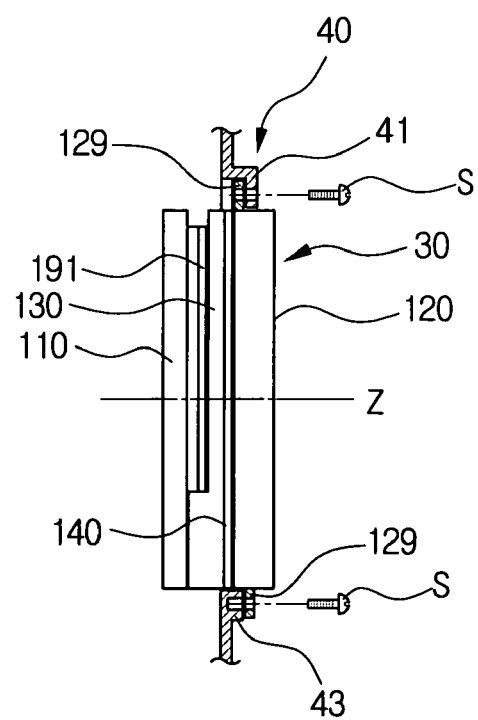
FIG. 25 is a sectional view taken on line II-II of FIG. 24.

As shown in FIG. 21, there is a fastening unit to fasten the signal delivery unit 180, the fixing bracket 110, and the hinge apparatus 30 assembled with the hinge unit 150 to the housing 21 and then to the body 10. Referring to FIGS. 23 and 24, the fastening unit includes a first fastening unit 40 to fasten the assembled hinge apparatus 30 to the housing 21. The first fastening unit 40 includes a holder 41 protruding from the circumference of the hinge hole 21a of the housing 21, and a supporting boss 43 provided among the holders 41. The holder 41 is created as a certain area of the circumference of the hinge hole 21a which is cut and made to protrude to a predetermined height. The holder 41 has a screw hole 41a defined therein. The fixtures 129 are fastened with the screw holes 41a of the holders 41, thus providing relative positions of the various components. The holder 41 and the fixtures 129 are fastened with each other by the screws (S). As the hinge bracket 120 is turned to the right from a state wherein the fixtures 129 and the holders 41 are in proximity with each other (FIG. 23), the fixtures 129 are inserted and thus aligned with the holders 41 (FIG. 25). The fixtures 129 and the holders 41 are fastened by the screws (S). The fixtures 129 are at the same height as the first surface 121a of the hinge bracket 120, and the holders 41 are provided in a symmetrical fashion with respect to the second axis Z.

The supporting boss 43 protrudes from the inner surface of the housing 21 to a predetermined height, and has a screw hole 43a therein. The fixtures 129 are fastened to the supporting bosses 43 by the screws (S).

Figure 26:
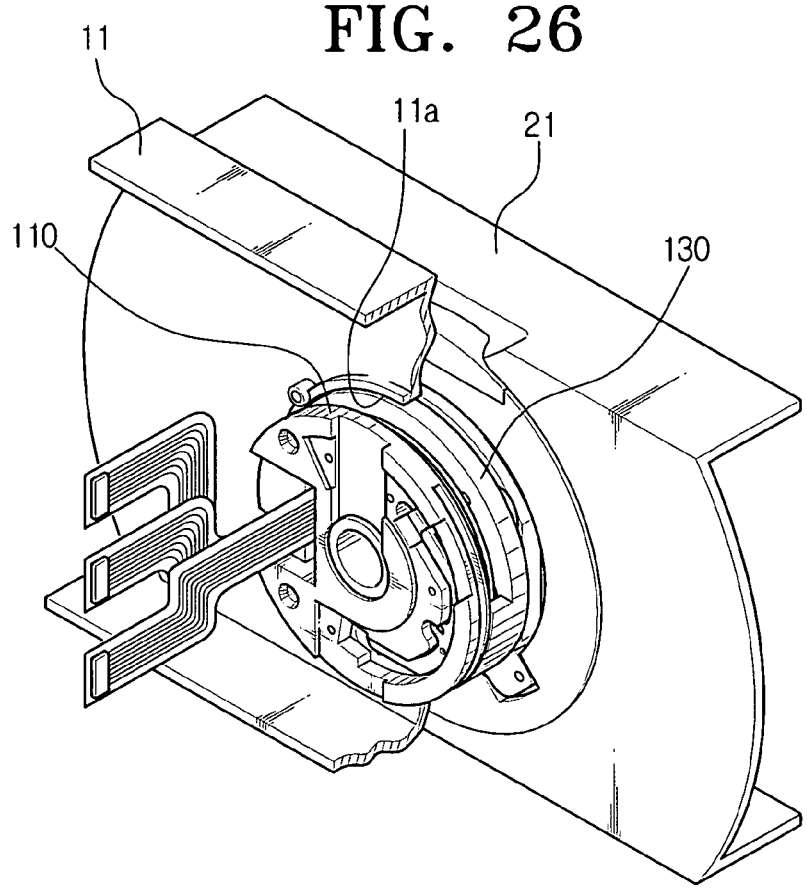
FIG. 26 is a perspective view illustrating a hinge apparatus according to a preferred embodiment of the present invention being pre-assembled to the main body.
Figure 27:
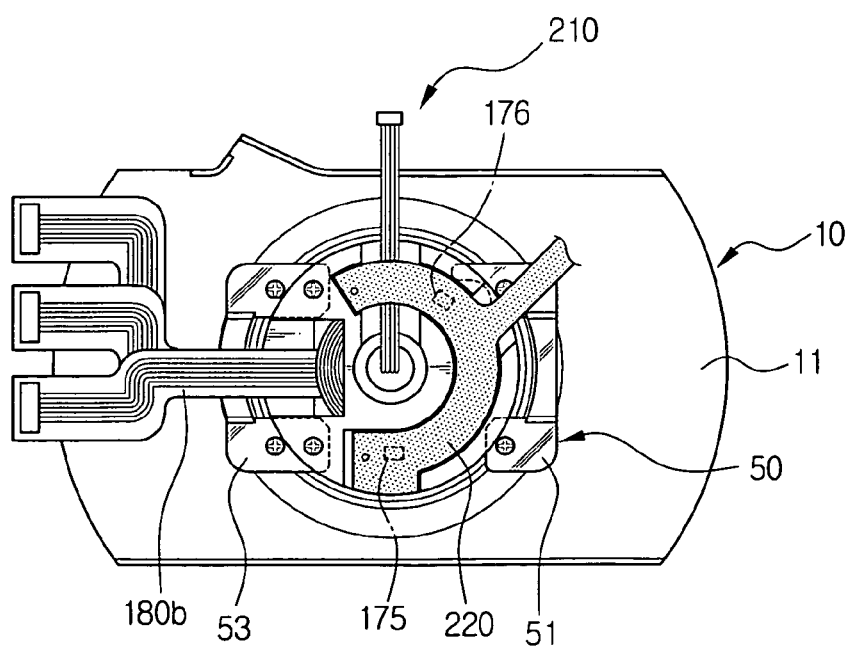
FIG. 27 is a plan view illustrating the hinge apparatus according to a preferred embodiment of the present invention being coupled to the main body.

As shown in FIG. 26, the fastening unit further includes a second fastening unit 50 to fasten the hinge apparatus 30 to the body 10. Referring now to FIG. 27, the second fastening unit 50 includes a first and a second supporting brackets 51, 53. The first supporting bracket 51 is partially inserted in the first connecting groove 118a (see FIG. 4) that is formed in the outer circumference of the fixing bracket 110, and then fastened to the inner wall of the main body 11. The second supporting bracket 53 is inserted in the second connecting groove 118b (see FIG. 4) opposite to the first connecting groove 118a, and then fastened to the fixing bracket 110 and the main body 11, respectively, by the screws (S).

A description of the assembling process for the image photographing apparatus constructed as above according to an embodiment of the present invention will now be given. Generally, the assembling process can be divided into assembling the hinge apparatus 30, assembling of the assembled hinge apparatus 30 with the housing 21, and then assembling of the body 10 with the hinge apparatus 30 and housing 21.

The assembling process of the hinge apparatus 30 will first be described. As shown in FIG. 7, the click plate 191 is inserted into the second rib 114 of the fixing bracket 110. The positioning protrusions 191c of the click plate 191 are aligned with the positioning recesses 114c of the fixing bracket 110. As a result, the click plate 191 is securely connected with the fixing bracket 110. However, prior to aligning the positioning protrusions 151c, of the click plate 191 with the positioning recess 114c of the fixing bracket 110, the sensing unit 170 has already been fastened to the fixing bracket 110.

Next, as shown in FIG. 8, the hinge unit 150 is assembled. To assemble the hinge unit 150, the plate spring 140, and then the contact plate 130 are inserted in the hinge bracket 120. The plate spring 140 and the fixing holes 133, 143 of the contact plate 130 are then inserted in the projections 123 of the hinge bracket 120. As a result, the plate spring 140 and the contact plate 130 are secured in a predetermined position with respect to the hinge bracket 120 and can be rotated together. The hinge bracket 120 and the contact plate 130 are assembled such that the positioning slits 120e, 130e formed in the outer circumferences can be aligned with one another. Prior to beginning the assembling process of hinge unit 150, the click balls 193 have already been assembled in the contact plate 130.

After the hinge unit 150 has been assembled, the signal delivery unit 180 is then assembled to the hinge unit 150, as shown in FIG. 10. The winding portion 180a of the signal delivery unit 180 is received in the annular groove 126 of the hinge bracket 120, with the second extensions 180*b* and the second connections 180*e* being passed through the passing hole 126*a* of the hinge bracket 120. In winding the signal delivery unit 180, as shown in FIG. 15, the straight portions 181*a*, 183*a*, 185*a* of the signal cables 181, 183, 185 are nested on one another. Next, the bending portions n2 of the respective signal cables 181, 183, 185 are aligned with one another (which is a slightly different configuration than what is shown in FIG. 15), and as shown in FIG. 16, the signal delivery unit 180 is wounded from the bending portions n2 to a predetermined inner diameter. The wound signal delivery unit 180 is then half-assembled to the hinge bracket 120.

The fixing bracket 110, after being assembled with the click plate 191, is then assembled to the hinge unit 150 which is assembled with the signal delivery unit 180. The assembling is performed with the positioning slits 110*e* of the fixing bracket 110 being aligned with the hinge bracket slit 120*e* and contact plate slit 130*e*. Next, as shown in FIG. 21, with the first extension 180*b* and the first connection 180*d* of the signal delivery unit 180 having been passed through the passing hole 116*a*, the shaft member 160 is passed through the fixing bracket 110 and the hinge unit 150 is caulked with the caulking plate 162, so that the fixing bracket 110 and the hinge unit 150 are tightly assembled with each other under a predetermined pressure.

As shown in FIG. 22, the sub circuit board 26 is assembled to the hinge apparatus 30 as described above. The supporting bosses 128*a* of the hinge bracket 120 are on the aligning ribs 128*b* in tight contact, and the sub circuit board 26 is assembled with screws. Next, the second extension 180*c* that is exposed through the second surface 121*b* of the hinge bracket 120 is bent approximately 90° so as to directly connect the second connections 180*e* to the sub circuit board 26.

As shown in FIG. 23, the hinge apparatus 30 is assembled so that the hinge apparatus 30 passes through the hinge hole 21*a* from within the housing 21. Next, the fastening units 129 of the hinge bracket 120 are positioned in proximity to the holders 41 of the housing 21, and the hinge bracket 120 is brought in tight contact with the inner wall of the housing 21. Then, the hinge apparatus 30 is turned to the right. As a result, and as shown in FIGS. 24 and 25, the fastening units 129 are overlain with the holders 41 and the supporting bosses 43. By fastening the fastening units 129 to the holders 41 and the supporting bosses 43 with the screws, the hinge bracket of the hinge apparatus 30 is fastened to the housing 21. In order to minimize the complexity of discussing the assembling process, the sub circuit board 26 and the signal delivery unit 180 are omitted from FIGS. 23 and 25.

When assembling the hinge apparatus 30 and the housing 21 have been assembled together, some components, including the first and the second camera units 23, 25, are mounted in the housing 21 and are connected to the second sub circuit board 26. The signal delivery unit 210 is passed through the hollow space of the shaft member 160 to connect with the components mounted in the housing 21.

After the housing 21 with the hinge apparatus 30 connected thereto is completely assembled, i.e., when the camera system 20 is completely assembled, and optical arrangement and required tests of the camera units 23, 25 are completed, the body 10 is connected to the housing 21 by using the hinge apparatus 30.

First, as shown in FIG. 26, the fixing bracket 110 of the hinge unit 30 and the contact plate 130 are passed through the hinge hole 11*a* of the main body 11. Then, as shown in FIG. 27, the supporting brackets 51, 53 are inserted in the connecting grooves 118*a*, 118*b* in the outer circumference of the fixing bracket 110, and fastened by the screws. Accordingly, the fixing bracket 110 is fastened to the main body 11, and as a result, the housing 21 is movably connected to the main body 11 to rotate at a predetermined angle. As described above, by completing the assembling of the body 10 with the hinge apparatus 30 later using separate supporting brackets 51, 53, removal of the camera unit 20 and the body 10 becomes easier. Accordingly, disassembling and assembling, for such purposes as repair, becomes easier.

The first extension 180*b* of the signal delivery unit 180 is bent approximately 90° to create a tight contact with the first receiving recess 117*b*. The signal delivery member 210 is also bent approximately to 90° to create a tight contact with the second receiving recess 117*b*. Next, the signal cables 220 on which the switches 175, 176 are supported are received in the fourth receiving recess 117*d* and assembled by some screws. Accordingly, the signal delivery unit 210 in the second receiving recess 117*b* is brought into tight contact by the signal cable 220 and is thus secured in place. The signal delivery unit 180, the signal delivery member 210, and the signal cables 220 are electrically connected with the main circuit board 16 and other components. Furthermore, by accommodating the signal delivery unit 180, the signal delivery member and the signal cables 210, 220 in the plurality of receiving recesses 117*a*, 117*b*, 117*d* formed in the first surface 111*a* in close contact, the overall volume of the hinge unit 30 can be reduced. This also allows the interval with the main circuit board 26 to be reduced. As a result, the image photographing apparatus can be made of compact size.

After assembling the hinge apparatus 30 and the main body 11, the whole assembling process is finally completed as the various components such as moving deck 12, are assembled in the corresponding position of the main body 11 and the sub body 13, respectively.

With the image photographing apparatus using the signal delivery unit according to a preferred embodiment of the present invention, the housing 21 is rotatably connected with the body 10 by use of the hinge apparatus 30 which is capable of detecting the rotation of the housing 21 with respect to the body 10. Therefore, according to the relative position of the rotating housing 21, a signal for the selection of DSC mode or DVC mode is transmitted and received between the housing 21 and the body 10. This is enabled by assembling the signal delivery unit 180 having a plurality of signal cables 181, 183, 185 to rotate integrally with the hinge apparatus 30.

Furthermore, as the click force providing unit is provided to the hinge apparatus 30, the user can feel the 'clicking' during the rotation of the housing 21 at every predetermined angle. Thus, the user can know and decide the range of the housing rotation.

Although the click force providing unit includes the click balls 193 provided to the contact plate 130, and the click plate 191 is secured in a predetermined position with respect to the fixing bracket 110, this is but one configuration embodiment and should not be considered as limiting. Other various alternatives are possible. For example, and although not shown in the drawings, the position of the click balls 193 and the click plate 191 can be shifted with each other. Or, alternatively, the click plate 191 can be omitted, while the click holes are formed directly in the first surface 110*a* of the fixing bracket 110 to correspond to the click balls 193.

With the signal delivery unit, the hinge apparatus and the image photographing apparatus according to the present invention as described above, the camera system is rotatably installed with respect to the body, while the DSC mode and the DVC mode can be selectively shifted (and determined) according to the rotational position of the camera system.

More specifically, through the use of the sensing unit provided to the hinge apparatus to detect the rotational position of the housing, the mode can be precisely detected. Further, because the signal delivery unit is installed to rotate together with the hinge apparatus within a predetermined angle, not only can the video signals captured by the camera units be transmitted and received between the body and the housing through the lines, but also various other electric signals.

Furthermore, because disassembling and assembling of the hinge apparatus, the housing, and the body become easier, maintenance and repairs are easier to perform, and improve as a result.

Although a few preferred embodiments of the present invention have been described, it will be understood by those skilled in the art that the present invention should not be limited to the described preferred embodiments, but various changes and modifications can be made within the spirit and scope of the present invention as defined by the appended claims.

I claim:

1. A hinge apparatus for rotatably connecting a housing with respect to a main body of an image photographing apparatus providing rotation of the housing in a predetermined rotation range, wherein the hinge apparatus comprises:
    a fixing bracket secured to the main body;
    a hinge unit secured to the housing, and connected to the fixing bracket to be reciprocatingly rotatable within a predetermined angle;
    a shaft member for rotatably connecting the hinge unit and the fixing bracket so that the hinge unit and the fixing bracket can rotate with respect to each other; and
    a sensing unit disposed on at least one of the hinge unit and the fixing bracket to sense the relative rotational range of the hinge unit with respect to the fixing bracket;
    wherein the fixing bracket further comprises a pair of sensing holes for detection by the sensing unit to enable the sensing unit to sense the relative rotational range of the hinge unit with respect to the fixing bracket.

2. The hinge apparatus for rotatably connecting a housing with respect to a main body of an image photographing apparatus according to claim 1, wherein the fixing bracket further comprises:
    a shaft hole for receiving the shaft member for rotatably connecting the hinge unit and the fixing bracket so that the hinge unit and the fixing bracket can rotate with respect to each other.

3. The hinge apparatus for rotatably connecting a housing with respect to a main body of an image photographing apparatus according to claim 1, wherein the pair of sensing holes are formed at predetermined distances from each other, and at a predetermined distance from the first axis.

4. The hinge apparatus for rotatably connecting a housing with respect to a main body of an image photographing apparatus according to claim 1, wherein:
    the image photographing apparatus comprises a first camera unit and a second camera unit; and
    the fixing bracket, the hinge unit, and the shaft member for allowing rotational movement between the first and second camera unit.

5. The hinge apparatus for rotatably connecting a housing with respect to a main body of an image photographing apparatus according to claim 4, wherein the first camera unit comprises a digital still camera, and the second camera unit comprises a digital video camera.

6. The hinge apparatus for rotatably connecting a housing with respect to a main body of an image photographing apparatus according to claim 4, wherein the sensing unit determines one of a first operating mode that indicates a digital still camera mode, and a second operating mode that indicates a digital video camera mode.

7. A hinge apparatus for rotatably connecting a housing with respect to a main body of an image photographing apparatus providing rotation of the housing in a predetermined rotation range, wherein the hinge apparatus comprises:
    a fixing bracket secured to the main body;
    a hinge unit secured to the housing, and connected to the fixing bracket to be reciprocatingly rotatable within a predetermined angle;
    a shaft member for rotatably connecting the hinge unit and the fixing bracket so that the hinge unit and the fixing bracket can rotate with respect to each other; and
    a sensing unit disposed on at least one of the hinge unit and the fixing bracket to sense the relative rotational range of the hinge unit with respect to the fixing bracket;
    wherein the fixing bracket comprises:
    a body having a first surface;
    a first locking protrusion protruding from the first surface of the body for restricting the rotational movement of the hinge unit when the first locking protrusion is rotated with respect to the hinge unit.

8. The hinge apparatus for rotatably connecting a housing with respect to a main body of an image photographing apparatus according to claim 7, wherein the first locking protrusion is provided at an outer position of the first surface of the body, and is formed at approximately 45° with respect to a first axis direction through the center of the hinge apparatus.

9. A hinge apparatus for rotatably connecting a housing with respect to a main body of an image photographing apparatus providing rotation of the housing in a predetermined rotation range, wherein the hinge apparatus comprises:
    a fixing bracket secured to the main body;
    a hinge unit secured to the housing, and connected to the fixing bracket to be reciprocatingly rotatable within a predetermined angle;
    a shaft member for rotatably connecting the hinge unit and the fixing bracket so that the hinge unit and the fixing bracket can rotate with respect to each other; and
    a sensing unit disposed on at least one of the hinge unit and the fixing bracket to sense the relative rotational range of the hinge unit with respect to the fixing bracket;
    wherein the fixing bracket further comprises:
    a first rib protruding from the first surface at a radial distance different from that at which the first locking protrusion protrudes; and
    a second rib protruding from the first rib, wherein said first and second rib being arranged to couple said fixing bracket to said hinge unit.

10. A hinge apparatus for rotatably connecting a housing with respect to a main body of an image photographing apparatus providing rotation of the housing in a predetermined rotation range, wherein the hinge apparatus comprises:
    a fixing bracket secured to the main body;
    a hinge unit secured to the housing, and connected to the fixing bracket to be reciprocatingly rotatable within a predetermined angle;
    a shaft member for rotatably connecting the hinge unit and the fixing bracket so that the hinge unit and the fixing bracket can rotate with respect to each other; and a sensing unit disposed on at least one of the hinge unit and the fixing bracket to sense the relative rotational range of the hinge unit with respect to the fixing bracket; wherein the hinge unit comprises:

a hinge bracket fixed onto the housing;

a contact plate connected with the hinge bracket; and a plate spring disposed between the hinge bracket and the contact plate for urging the contact plate toward the fixing bracket.

11. The hinge apparatus for rotatably connecting a housing with respect to a main body of an image photographing apparatus according to claim 10, wherein the hinge bracket comprises:

a body, comprising a first surface, a shaft hole for receiving the shaft member and an annular rib protruding from the first surface.

12. The hinge apparatus for rotatably connecting a housing with respect to a main body of an image photographing apparatus according to claim 11, wherein the annular rib comprises:

a cam surface, with a variable height, provided to an upper end of the annular rib along the circumference of the annular rib, for detecting a movement range of the fixing bracket that rotates.

13. The hinge apparatus for rotatably connecting a housing with respect to a main body of an image photographing apparatus according to claim 12, wherein the cam surface comprises:

an operating surface formed by a first predetermined length at the substantially the same height as the annular rib, wherein the operating surface faces the second rib of the fixing bracket in contact therewith;

a non-contact surface formed on a lower plane than the operating surface with a second predetermined length; and an inclined surface connecting the operating surface and the non-contact surface.

14. A hinge apparatus for rotatably connecting a housing with respect to a main body of an image photographing apparatus providing rotation of the housing in a predetermined rotation range, wherein the hinge apparatus comprises:

a fixing bracket secured to the main body;

a hinge unit secured to the housing, and connected to the fixing bracket to be reciprocatingly rotatable within a predetermined angle;

a shaft member for rotatably connecting the hinge unit and the fixing bracket so that the hinge unit and the fixing bracket can rotate with respect to each other; and a sensing unit disposed on at least one of the hinge unit and the fixing bracket to sense the relative rotational range of the hinge unit with respect to the fixing bracket; wherein the sensing unit comprises:

a substantially elastic piece;

a pair of cam pins disposed on both ends of the elastic piece for sensing the relative rotational range of the hinge unit with respect to the fixing bracket; and a pair of switches provided at positions corresponding to the cam pins for providing a signal indicating an operating mode of the image photographing apparatus.

15. The hinge apparatus for rotatably connecting a housing with respect to a main body of an image photographing apparatus according to claim 14, wherein the elastic piece includes metal.

16. The hinge apparatus for rotatably connecting a housing with respect to a main body of an image photographing apparatus according to claim 14, wherein the cam pins are positioned to protrude through sensing holes disposed in the fixing bracket.

17. A hinge apparatus for rotatably connecting a housing with respect to a main body of an image photographing apparatus providing rotation of the housing in a predetermined rotation range, wherein the hinge apparatus comprises:

a fixing bracket secured to the main body;

a hinge unit secured to the housing, and connected to the fixing bracket to be reciprocatingly rotatable within a predetermined angle;

a shaft member for rotatably connecting the hinge unit and the fixing bracket so that the hinge unit and the fixing bracket can rotate with respect to each other;

a sensing unit disposed on at least one of the hinge unit and the fixing bracket to sense the relative rotational range of the hinge unit with respect to the fixing bracket; and a click force providing unit disposed between the fixing bracket and the contact plate for providing a predetermined indication at predetermined intervals during the rotation of the housing with respect to the body.

18. The hinge apparatus for rotatably connecting a housing with respect to a main body of an image photographing apparatus according to claim 17, wherein the click force providing unit comprises:

a click plate connected to the fixing bracket; and at least one click ball arranged between the click plate and the contact plate for providing the predetermined indication.

19. The hinge apparatus for rotatably connecting a housing with respect to a main body of an image photographing apparatus according to claim 18, wherein the click plate further comprises:

a plurality of click balls.

20. The hinge apparatus for rotatably connecting a housing with respect to a main body of an image photographing apparatus according to claim 18, wherein the click plate includes metal.

21. The hinge apparatus for rotatably connecting a housing with respect to a main body of an image photographing apparatus according to claim 18, wherein the click plate further comprises:

a plurality of click holes formed at predetermined angles with respect to the first axis.

22. The hinge apparatus for rotatably connecting a housing with respect to a main body of an image photographing apparatus according to claim 21, wherein the predetermined angles are arranged in intervals of approximately 45°.

23. The hinge apparatus for rotatably connecting a housing with respect to a main body of an image photographing apparatus according to claim 18, wherein the click plate further comprises:

a guide groove for guiding the click balls to roll between the click holes.

24. A hinge apparatus for rotatably connecting a housing with respect to a main body of an image photographing apparatus providing rotation of the housing in a predetermined rotation range, wherein the hinge apparatus comprises:

a fixing bracket secured to the main body;

a hinge unit secured to the housing, and connected to the fixing bracket to be reciprocatingly rotatable within a predetermined angle;

a shaft member for rotatably connecting the hinge unit and the fixing bracket so that the hinge unit and the fixing bracket can rotate with respect to each other;

a sensing unit disposed on at least one of the hinge unit and the fixing bracket to sense the relative rotational range of the hinge unit with respect to the fixing bracket;

a pair of sensor holes disposed within the fixing bracket;

a cam surface comprising an operating surface, a non-contact surface and an inclined surface, the cam surface located on the hinge unit; and an elastic piece comprising a pair of cam pins disposed to protrude through the pair of sensor holes, and a pair of switches disposed to contact the pair of cam pins;

wherein as the cam pins protrude through the sensing holes, the cam pins are pushed backwards by contact with the operating surface to contact one of the pair of switches due to the operating surface being formed of a third predetermined length in consideration of the interval between the cam pins such that only one of the cam pins can be contacted by the operating surface, and an operating mode of the image photographing apparatus is determined by which cam pin contacts the operating surface and is pushed back to contact one of the pair of switches.

25. An image photographing apparatus, comprising:

a main body;

a fixing bracket secured to the main body;

a camera system comprising a first camera unit capturing a digital still image and a second camera unit capturing a digital video image;

a hinge apparatus rotatably connecting the main body and the camera system;

a signal delivery unit electrically connecting the main body and the camera system;

a sensing unit disposed on at least one of the hinge apparatus and the fixing bracket to sense the relative rotational range of the hinge apparatus with respect to the fixing bracket; and a liquid crystal display (LCD) panel displaying the captured digital video image;

wherein the first camera unit and the second camera unit are turned on or off by rotation of the main body and the camera system; and wherein the fixing bracket further comprises a pair of sensing holes for detection by the sensing unit to enable the sensing unit to sense the relative rotational range of the hinge apparatus with respect to the fixing bracket.

26. The image photographing apparatus according to claim 25, wherein the signal delivery unit comprises a signal cable electrically connecting a digital still image signal, and another signal cable electrically connecting a digital video image signal.

* * * * *